(12) United States Patent
Sudo et al.

(10) Patent No.: US 9,260,661 B2
(45) Date of Patent: Feb. 16, 2016

(54) NEMATIC LIQUID CRYSTAL COMPOSITION AND LIQUID CRYSTAL DISPLAY ELEMENT INCLUDING THE SAME

(71) Applicant: DIC Corporation, Tokyo (JP)

(72) Inventors: Go Sudo, Kita-adachi-gun (JP); Shotaro Kawakami, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/422,275

(22) PCT Filed: Jan. 16, 2014

(86) PCT No.: PCT/JP2014/050645
§ 371 (c)(1),
(2) Date: Feb. 18, 2015

(87) PCT Pub. No.: WO2014/112547
PCT Pub. Date: Jul. 24, 2014

(65) Prior Publication Data
US 2015/0218450 A1 Aug. 6, 2015

(30) Foreign Application Priority Data

Jan. 21, 2013 (JP) .................................. 2013-008326

(51) Int. Cl.
- *C09K 19/30* (2006.01)
- *C09K 19/12* (2006.01)
- *C09K 19/52* (2006.01)
- *C09K 19/20* (2006.01)
- *C09K 19/02* (2006.01)
- C09K 19/04 (2006.01)
- C09K 19/54 (2006.01)
- G02F 1/1337 (2006.01)
- G02F 1/137 (2006.01)

(52) U.S. Cl.
CPC ......... *C09K 19/3066* (2013.01); *C09K 19/0216* (2013.01); *C09K 19/20* (2013.01); *C09K 19/3003* (2013.01); *C09K 19/54* (2013.01); C09K 2019/0448 (2013.01); C09K 2019/122 (2013.01); C09K 2019/123 (2013.01); C09K 2019/301 (2013.01); C09K 2019/303 (2013.01); C09K 2019/3004 (2013.01); C09K 2019/305 (2013.01); C09K 2019/3009 (2013.01); C09K 2019/3016 (2013.01); C09K 2019/3027 (2013.01); C09K 2019/548 (2013.01); G02F 2001/13712 (2013.01); G02F 2001/133742 (2013.01)

(58) Field of Classification Search
CPC ........ C09K 19/20; C09K 19/52; C09K 19/54; C09K 2019/122; C09K 2019/123; C09K 2019/3004; C09K 2019/3009; C09K 2019/3016; C09K 2019/301; C09K 2019/3013; C09K 2019/303; C09K 2019/305; C09K 2019/0448; G02F 1/13
See application file for complete search history.

(56) References Cited

U.S. PATENT DOCUMENTS

| | | | |
|---|---|---|---|
| 9,102,869 B2* | 8/2015 | Furusato | C09K 19/3003 |
| 2006/0124896 A1* | 6/2006 | Klasen-Memmer et al. | 252/299.01 |
| 2008/0149891 A1 | 6/2008 | Klasen-Memmer et al. | |
| 2010/0051864 A1 | 3/2010 | Klasen-Memmer et al. | |
| 2011/0043747 A1 | 2/2011 | Kawasaki et al. | |
| 2011/0149226 A1 | 6/2011 | Saito et al. | |
| 2012/0162595 A1* | 6/2012 | Lee et al. | 349/183 |
| 2012/0305843 A1* | 12/2012 | Klasen-Memmer et al. | 252/299.61 |
| 2014/0097383 A1* | 4/2014 | Furusato et al. | 252/299.61 |

FOREIGN PATENT DOCUMENTS

| | | |
|---|---|---|
| EP | 0474062 A2 | 3/1992 |
| JP | 08-104869 A | 4/1996 |
| JP | 2001-354967 A | 12/2001 |
| JP | 2003-327965 A | 11/2003 |
| JP | 2006-037054 A | 2/2006 |
| JP | 2006-301643 A | 11/2006 |
| JP | 2008-143902 A | 6/2008 |
| JP | 2008-144135 A | 6/2008 |
| JP | 2009-057562 A | 3/2009 |
| JP | 2011-042696 A | 3/2011 |
| WO | 2007/077872 A1 | 7/2007 |
| WO | 2010/029843 A1 | 3/2010 |
| WO | 2013/125379 A1 | 8/2013 |

OTHER PUBLICATIONS

International Search Report dated Feb. 25, 2014, issued in corresponding application No. PCT/JP2014/050645.

* cited by examiner

*Primary Examiner* — Shean C Wu
(74) *Attorney, Agent, or Firm* — Westerman, Hattori, Daniels & Adrian, LLP

(57) ABSTRACT

There is provided a liquid crystal composition having a sufficiently low viscosity ($\eta$), a sufficiently low rotational viscosity ($\gamma 1$), a high elastic constant ($K_{33}$), and a negative dielectric anisotropy ($\Delta\epsilon$), the absolute value of the negative dielectric anisotropy being large, without a reduction in the refractive index anisotropy ($\Delta n$) or the nematic phase-isotropic liquid phase transition temperature ($T_{ni}$) thereof. By using the liquid crystal composition, it is possible to provide a liquid crystal display element, such as a VA-type liquid crystal display element, which eliminates or reduces the risk of a faulty display and realizes high display quality and a high-speed response. The liquid crystal display element including the liquid crystal composition according to the present invention may be suitably used as a liquid crystal display element for active-matrix driving and may also be used as, for example, a VA-type or PSVA-type liquid crystal display element.

20 Claims, No Drawings

NEMATIC LIQUID CRYSTAL COMPOSITION AND LIQUID CRYSTAL DISPLAY ELEMENT INCLUDING THE SAME

TECHNICAL FIELD

The present invention relates to a nematic liquid crystal composition having a negative dielectric anisotropy ($\Delta\in$) which is suitably used for producing liquid crystal displays and to a liquid crystal display element that includes the nematic liquid crystal composition.

BACKGROUND ART

Liquid crystal display elements have been used in clocks, electronic calculators, various home appliances, measurement machines, panels for automobiles, word processors, electronic personal organizers, printers, computers, TVs, and the like. Representative examples of a liquid crystal display method include TN (twisted nematic) type, STN (super-twisted nematic) type, DS (dynamic light scattering) type, GH (guest-host) type, IPS (in-plane switching) type, OCB (optically compensated birefringence) type, ECB (electrically controlled birefringence) type, VA (vertical alignment) type, CSH (color super-homeotropic) type, and FLC (ferroelectric liquid crystal) type. Examples of a method for driving the liquid crystal display element include static driving, multiplex driving, a simple matrix method, and an active-matrix (AM) method in which a liquid crystal display element is driven using a TFT (thin-film transistor), a TFD (thin-film diode), or the like.

Among the display methods described above, for example, in an IPS-type display method, an ECB-type display method, a VA-type display method, and a CSH-type display method, a liquid crystal material having a negative $\Delta\in$ is used. Among these display methods, in particular, a VA-type display method in which a liquid crystal display element is driven by AM driving has been employed by display elements that require a high speed and a wide viewing angle, such as TVs.

A nematic liquid crystal composition required for a VA-type display method or the like requires low-voltage driving, a high-speed response, and a wide operating temperature range. In other words, such a nematic liquid crystal composition requires a negative $\Delta\in$, the absolute value of $\Delta\in$ being large, a low viscosity, and a high nematic phase-isotropic liquid phase transition temperature ($T_{ni}$). In addition, due to the configuration of the product $\Delta n \times d$ of refractive index anisotropy ($\Delta n$) and cell gap (d), it is necessary to control the $\Delta n$ of a liquid crystal material to be within an appropriate range in accordance with cell gap. Furthermore, in the case where the liquid crystal display element is used in TVs or the like, primary importance is placed on a high-speed response capability. Therefore, a liquid crystal material having a low viscosity ($\eta$) is anticipated.

Hitherto, various studies of compounds having a negative $\Delta\in$, the absolute value of $\Delta\in$ being large, have been conducted in order to improve the characteristics of a liquid crystal composition.

The following liquid crystal composition that includes the liquid crystal compounds (A) and (B) having a 2,3-difluorophenylene skeleton (see PTL 1) has been disclosed as a liquid crystal material having a negative $\Delta\in$.

[Chem. 1]

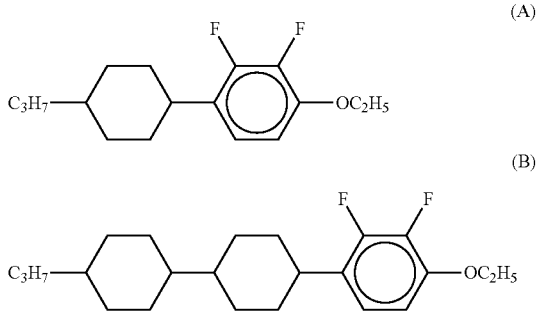

This liquid crystal composition includes liquid crystal compounds (C) and (D) having a $\Delta\in$ of substantially zero. However, the viscosity of the liquid crystal composition has not yet been reduced to a sufficiently low level appropriate for a liquid crystal composition that requires a high-speed response suitable for liquid crystal TVs or the like.

[Chem. 2]

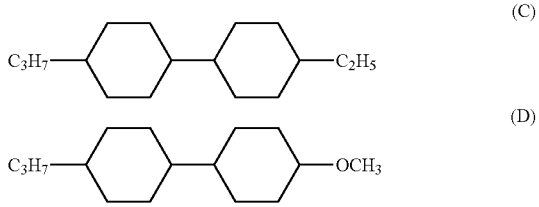

A liquid crystal composition that includes the compound represented by Formula (E) has also been disclosed. However, this liquid crystal composition (see PTL 3) includes a low-$\Delta n$ liquid crystal composition (see PTL 2) that includes the above-described liquid crystal compound (D) and, in order to increase response speed, a compound (alkenyl compound) having an alkenyl group in the molecule, such as the liquid crystal compound (F). Thus, further studies are needed in order to achieve a high $\Delta n$ and high reliability.

[Chem. 3]

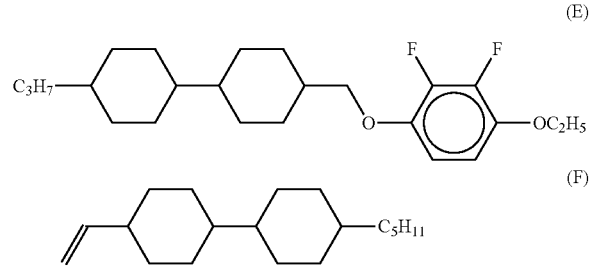

A liquid crystal composition that includes the compound represented by Formula (G) has been disclosed (see PTL 4). Since this liquid crystal composition also includes a compound including an alkenyl compound, such as the liquid crystal compound (F) described above, a faulty display such as burn-in or display unevenness is likely to occur.

[Chem. 4]

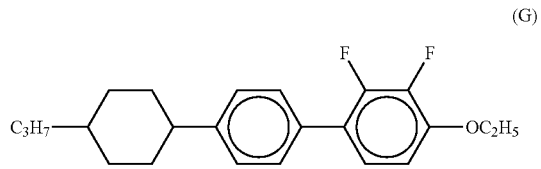

(G)

The impact of a liquid crystal composition that includes an alkenyl compound on a faulty display has been disclosed (see PTL 5). On the other hand, generally, a reduction in the content of an alkenyl compound in a liquid crystal composition increases the η of the liquid crystal composition, which makes it difficult to realize a high-speed response. Thus, it has been difficult to reduce the risk of a faulty display and achieves a high-speed response.

As described above, it has been difficult to develop a liquid crystal composition having a negative $\Delta\in$ which allows a high $\Delta n$ and a low η to be achieved and which eliminates or reduces the risk of a faulty display only by using a compound having a negative $\Delta\in$ and liquid crystal compounds (C), (D), and (F) in combination.

A liquid crystal composition that includes the compound represented by Formula (A), the compound represented by Formula (G), and the compound represented by Formula (III-F31) having a $\Delta\in$ of substantially zero (see PTL 6) is disclosed. However, the content of the compound represented by Formula (III-F31) in this liquid crystal composition is limited because it has been considered impossible to increase the content of a compound having a low vapor pressure since such a compound is volatile under the extremely low pressure generated when a liquid crystal composition is injected into liquid crystal cells during the process of manufacturing a liquid crystal display element. Thus, this liquid crystal composition is disadvantageous in that it has a significantly high viscosity while having a high $\Delta n$.

[Chem. 5]

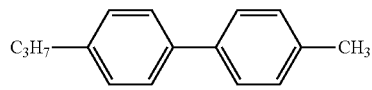

(III-F31)

In PTLs 6 and 7, there has already been disclosed a liquid crystal composition that includes a compound having a fluorine-substituted terphenyl structure.

In PTL 8, there has been disclosed a method for improving the response speed of homeotropic liquid crystal cells by using a liquid crystal material whose index expressed by (Formula 1) is large. However, the effect of the method is not ideal.

[Math. 1]

$$FoM = K_{33} \cdot \Delta n^2 / \gamma 1$$ (Formula 1)

$K_{33}$: elastic constant
$\Delta n$: refractive index anisotropy
$\gamma 1$: rotational viscosity Accordingly, it has been required for a liquid crystal composition used for producing liquid crystal TVs or the like, which requires a high-speed response, to reduce viscosity (η) and rotational viscosity (γ1) to be sufficiently low and increase elastic constant ($K_{33}$) to be high without reducing refractive index anisotropy ($\Delta n$) or nematic phase-isotropic liquid phase transition temperature ($T_{ni}$).

CITATION LIST

Patent Literature

PTL 1: Japanese Unexamined Patent Application Publication No. 8-104869
PTL 2: European Patent Application Publication No. 0474062
PTL 3: Japanese Unexamined Patent Application Publication No. 2006-37054
PTL 4: Japanese Unexamined Patent Application Publication No. 2001-354967
PTL 5: Japanese Unexamined Patent Application Publication No. 2008-144135
PTL 6: WO2007/077872
PTL 7: Japanese Unexamined Patent Application Publication No. 2003-327965
PTL 8: Japanese Unexamined Patent Application Publication No. 2006-301643

SUMMARY OF INVENTION

Technical Problem

An object of the present invention is to provide a liquid crystal composition having a sufficiently low viscosity (η), a sufficiently low rotational viscosity (γ1), a high elastic constant ($K_{33}$), a high voltage holding ratio (VHR), and a negative dielectric anisotropy ($\Delta\in$), the absolute value of $\Delta\in$ being large, without a reduction in the refractive index anisotropy ($\Delta n$) or the nematic phase-isotropic liquid phase transition temperature ($T_{ni}$) thereof. Another object of the present invention is to provide a liquid crystal display element including the liquid crystal composition, such as a VA-type liquid crystal display element, which eliminates or reduces the risk of a faulty display and realizes high display quality and a high-speed response.

Solution to Problem

The inventors of the present invention have studied various bicyclohexyl derivatives and fluorobenzene derivatives and, as a result, found that it is possible to achieve the above-described objects by using specific compounds in combination. Thus, the present invention was made.

The present invention provides a liquid crystal composition including, as a first component, the compound represented by Formula (Ib) and the compound represented by Formula (Ic).

[Chem. 6]

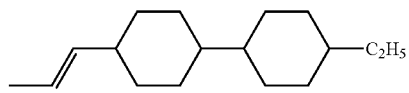

(Ib)

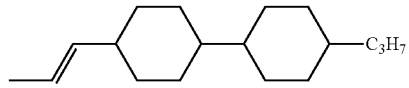

(Ic)

The total content of the compounds is 10% to 70% by mass. The liquid crystal composition further includes, as a second component, a compound having a negative dielectric anisotropy (Δ∈), and the absolute value of the dielectric anisotropy (Δ∈) is more than 3. The present invention also provides a liquid crystal display element that includes the liquid crystal composition.

Advantageous Effects of Invention

The liquid crystal composition according to the present invention has a sufficiently low viscosity (η), a sufficiently low rotational viscosity (γ1), a high elastic constant ($K_{33}$), a high voltage holding ratio (VHR), and a negative dielectric anisotropy (Δ∈), the absolute value of Δ∈ being large, without a reduction in the refractive index anisotropy (Δn) or the nematic phase-isotropic liquid phase transition temperature ($T_{ni}$) thereof. Therefore, by using the liquid crystal composition, it is possible to provide a liquid crystal display element, such as a VA-type liquid crystal display element, which eliminates or reduces the risk of a faulty display and realizes high display quality and a high-speed response.

DESCRIPTION OF EMBODIMENTS

The liquid crystal composition according to the present invention includes, as a first component, the compound represented by Formula (Ib) and the compound represented by Formula (Ic) that have a propenyl-terminal group, which are essential components of the liquid crystal composition. The total content of the compound represented by Formula (Ib) and the compound represented by Formula (Ic) is 10% to 70% by mass, is further preferably 10% to 55% by mass, and is most preferably 15% to 45% by mass. More specifically, the total content of the compound represented by Formula (Ib) and the compound represented by Formula (Ic) is preferably 15% to 50% by mass in order to reduce viscosity or rotational viscosity and is preferably 10% to 40% by mass in the case where primary importance is placed on a reduction in the risk of precipitation that may occur at a low temperature. The content of the compound represented by Formula (Ib) is preferably 5% to 40% by mass, is further preferably 5% to 30% by mass, and is most preferably 10% to 30% by mass. The content of the compound represented by Formula (Ic) is preferably 5% to 30% by mass, is further preferably 5% to 25% by mass, and is most preferably 5% to 15% by mass.

The liquid crystal composition according to the present invention includes, as a second component, one or more compounds having a negative Δ∈, the absolute value of Δ∈0 being more than 3. The number of such compounds is preferably 2 to 20, is further preferably 3 to 15, and is most preferably 3 to 10. The content of such compounds is preferably 10% to 90% by mass, is further preferably 20% to 80% by mass, and is most preferably 30% to 70% by mass.

The second component is preferably one or more compounds represented by General Formula (II).

[Chem. 7]

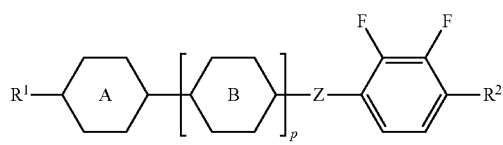

(II)

In General Formula (II), $R^1$ and $R^2$ each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms; one —$CH_2$— group included in $R^1$ and $R^2$ or two or more —$CH_2$— groups that are included in $R^1$ and $R^2$ and are not adjacent to each other may be each independently replaced by —O— and/or —S—; one or more hydrogen atoms included in $R^1$ and $R^2$ may be each independently replaced by a fluorine atom or a chlorine atom; the rings A and B each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group; p is 0, 1, or 2; and Z represents —$OCH_2$—, —$CH_2O$—, —$CF_2O$—, —$OCF_2$—, —$CH_2CH_2$—, —$CF_2CF_2$—, or a single bond. In General Formula (II), $R^1$ and $R^2$ are further preferably each independently a straight-chain alkyl group having 1 to 5 carbon atoms, an alkoxyl group having 1 to 5 carbon atoms, an alkenyl group having 2 to 5 carbon atoms, or an alkenyloxy group having 2 to 5 carbon atoms; and it is particularly preferable that $R^1$ is an alkyl group having 1 to 5 carbon atoms or an alkenyl group having 2 to 5 carbon atoms and $R^2$ is an alkoxyl group having 1 to 5 carbon atoms.

In General Formula (II), the rings A and B are further preferably each independently a trans-1,4-cyclohexylene group, a 1,4-phenylene group, a 2-fluoro-1,4-phenylene group, a 3-fluoro-1,4-phenylene group, a 3,5-difluoro-1,4-phenylene group, or a 2,3-difluoro-1,4-phenylene group and are most preferably each independently a trans-1,4-cyclohexylene group or a 1,4-phenylene group.

In General Formula (II), p is further preferably each independently 0 or 1.

In General Formula (II), Z is further preferably —$CH_2O$—, —$CF_2O$—, —$CH_2CH_2$—, or a single bond and is most preferably —$CH_2O$— or a single bond.

Further Specifically, a compound represented by General Formula (II) is preferably any one of compounds represented by General Formulae (II-A1) to (II-A5) and compounds represented by General Formulae (II-B1) to (II-B5), is further preferably any one of compounds represented by General Formulae (II-A1) to (II-A5), and is most preferably any one of compounds represented by General Formulae (II-A1) to (II-A3).

[Chem. 8]

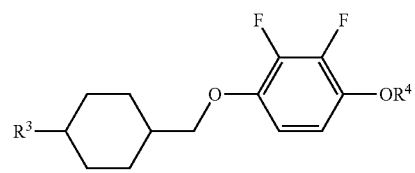

(II-A1)

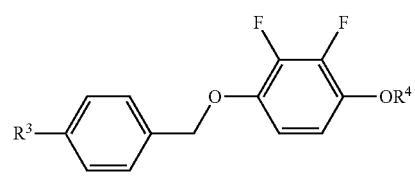

(II-A2)

-continued

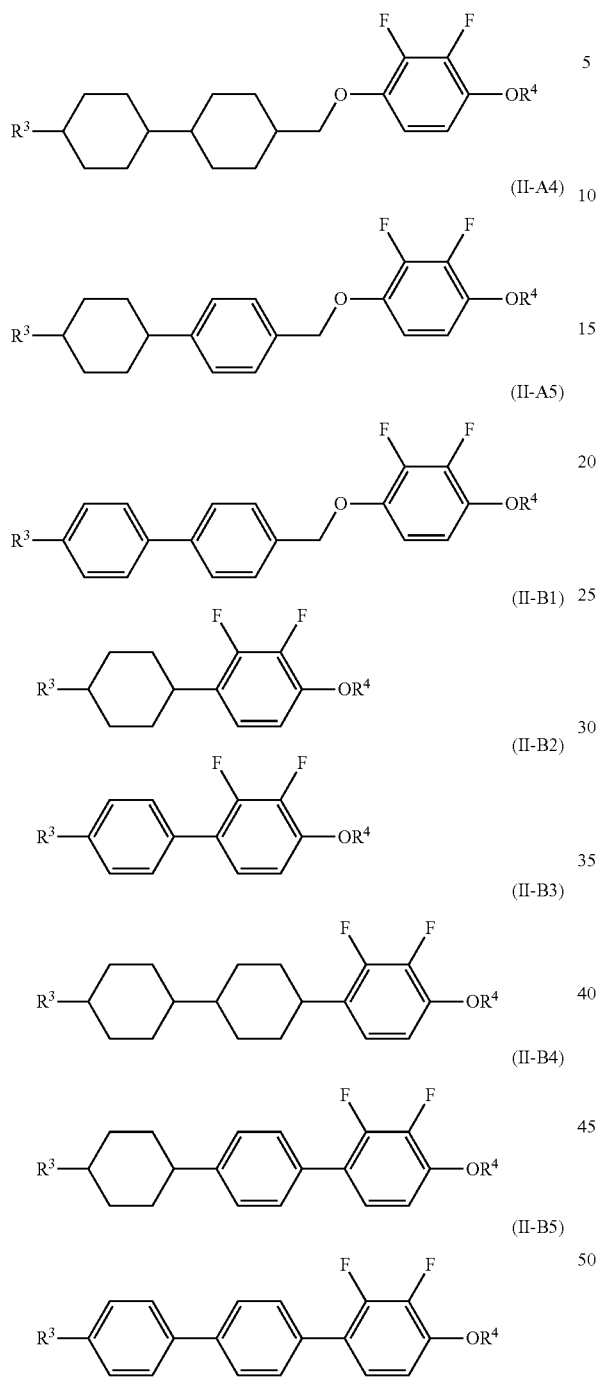

(II-A3)
(II-A4)
(II-A5)
(II-B1)
(II-B2)
(II-B3)
(II-B4)
(II-B5)

(III-A)

(III-B)

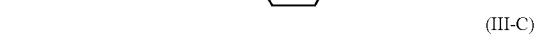
(III-C)

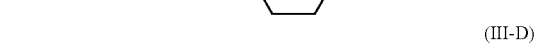
(III-D)

(III-E)

(III-F)

(III-G)

(III-H)

(III-I)

(III-J)

In General Formulae (II-A1) to (II-B5), $R^3$ and $R^4$ each independently represent an alkyl group having 1 to 5 carbon atoms or an alkenyl group having 2 to 5 carbon atoms; and one or more hydrogen atoms included in $R^3$ and $R^4$ may be each independently replaced by a fluorine atom.

The liquid crystal composition according to the present invention includes, as a third component, one or more compounds selected from compounds represented by General Formulae (III-A) to (III-J). The content of such compounds is preferably 10% to 70% by mass and is further preferably 20% to 60% by mass.

In General Formulae (III-A) to (III-J), $R^5$ represents an alkyl group having 1 to 5 carbon atoms or an alkenyl group having 2 to 5 carbon atoms; $R^6$ represents an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms.

Note that, a compound represented by General Formula (III-A) is different from the compound represented by Formula (Ib) and the compound represented by Formula (Ic).

The third component is further preferably a compound selected from compounds represented by General Formulae (III-A), (III-D), (III-F), (III-G), and (III-H) and is most preferably a compound represented by General Formula (III-A).

The liquid crystal composition according to the present invention preferably includes the compound represented by Formula (Ib), the compound represented by Formula (Ic), a compound represented by General Formula (II-A1), and a compound represented by General Formula (III-A); preferably includes the compound represented by Formula (Ib), the compound represented by Formula (Ic), a compound represented by General Formula (II-A3), and a compound represented by General Formula (III-A); preferably includes the compound represented by Formula (Ib), the compound represented by Formula (Ic), a compound represented by General Formula (II-B1), and a compound represented by General Formula (III-A); preferably includes the compound represented by Formula (Ib), the compound represented by Formula (Ic), a compound represented by General Formula (II-B2), and a compound represented by General Formula (III-A); preferably includes the compound represented by Formula (Ib), the compound represented by Formula (Ic), a compound represented by General Formula (II-B3), and a compound represented by General Formula (III-A); and preferably includes the compound represented by Formula (Ib), the compound represented by Formula (Ic), a compound represented by General Formula (II-B4), and a compound represented by General Formula (III-A). The liquid crystal composition according to the present invention further preferably includes the compound represented by Formula (Ib), the compound represented by Formula (Ic), a compound represented by General Formula (II-A1), and a compound represented by General Formula (III-A); and further preferably includes the compound represented by Formula (Ib), the compound represented by Formula (Ic), a compound represented by General Formula (II-A3), and a compound represented by General Formula (III-A). The liquid crystal composition according to the present invention most preferably includes the compound represented by Formula (Ib), the compound represented by Formula (Ic), a compound represented by General Formula (II-A1), a compound represented by General Formula (II-A3), and a compound represented by General Formula (III-A).

The liquid crystal composition according to the present invention preferably further includes, as another component, one or more compounds represented by General Formula (V). The content of such compounds is preferably 2% to 30% by mass, is further preferably 2% to 25% by mass, and is most preferably 3% to 20% by mass.

[Chem. 11]

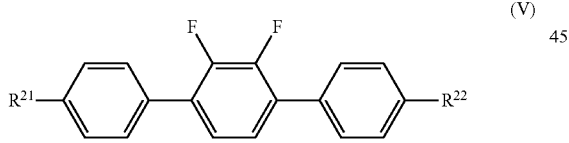

(V)

In General Formula (V), $R^{21}$ and $R^{22}$ each independently represent an alkyl group having 1 to 8 carbon atoms, an alkoxyl group having 1 to 8 carbon atoms, an alkenyl group having 2 to 8 carbon atoms, or an alkenyloxyl group having 2 to 8 carbon atoms and are preferably each independently an alkyl group having 1 to 5 carbon atoms or an alkenyl group having 2 to 5 carbon atoms.

The total content of the compounds represented by Formulae (Ib), (Ic), (II), and (III-A) to (III-J) in the liquid crystal composition according to the present invention is preferably 85% to 100% by mass, is more preferably 90% to 100% by mass, and is further preferably 95% to 100% by mass. The total content of the compounds represented by Formulae (Ib), (Ic), (II), (III-A) to (III-J), and (V) in the liquid crystal composition according to the present invention is further preferably 90% to 100% by mass and is most preferably 95% to 100% by mass.

The dielectric anisotropy (Δ∈) at 25° C. of the liquid crystal composition according to the present invention is −2.0 to −8.0, is preferably −2.0 to −6.0, is more preferably −2.0 to −5.0, and is most preferably −2.5 to −4.0.

The refractive index anisotropy (Δn) at 20° C. of the liquid crystal composition according to the present invention is 0.08 to 0.14, is more preferably 0.09 to 0.13, and is most preferably 0.09 to 0.12. More specifically, the refractive index anisotropy (Δn) at 20° C. of the liquid crystal composition is preferably 0.10 to 0.13 in order to set the refractive index anisotropy to be appropriate to a small cell gap and is preferably 0.08 to 0.10 in order to set the refractive index anisotropy to be appropriate to a large cell gap.

The viscosity (η) at 20° C. of the liquid crystal composition according to the present invention is 10 to 30 mPa·s, is more preferably 10 to 25 mPa·s, and is most preferably 10 to 22 mPa·s.

The rotational viscosity ($γ_1$) at 20° C. of the liquid crystal composition according to the present invention is 60 to 130 mPa·s, is more preferably 60 to 110 mPa·s, and is most preferably 60 to 100 mPa·s.

The nematic phase-isotropic liquid phase transition temperature ($T_{ni}$) of the liquid crystal composition according to the present invention is 60° C. to 120° C., is more preferably 70° C. to 100° C., and is most preferably 70° C. to 85° C.

The liquid crystal composition according to the present invention may further include, in addition to the above-described compounds, an ordinary nematic liquid crystal, a smectic liquid crystal, a cholesteric liquid crystal, an antioxidant, a ultraviolet absorber, a polymerizable monomer, and the like.

For example, the liquid crystal composition according to the present invention preferably includes, as a polymerizable monomer, a polymerizable compound such as a biphenyl derivative or a terphenyl derivative at a content of 0.01% to 2%.

An example of the polymerizable compound is

[Chem. 12]

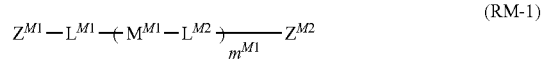

(RM-1)

a compound represented by General Formula (RM-1) above.

In General Formula (RM-1), $Z^{M1}$ and $Z^{M2}$ each independently represent the following structure:

[Chem. 13]

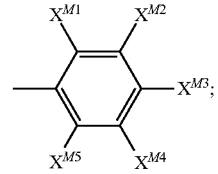

$X^{M1}$ to $X^{M5}$ each independently represent a hydrogen atom, a fluorine atom, or the following structure:

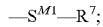  [Chem. 14]

at least one of $X^{M1}$ to $X^{M5}$ represents the following structure:

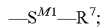  [Chem. 15]

$X^{M2}$ or $X^{M3}$ is preferably the following structure:

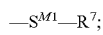   [Chem. 16]

and $XM^3$ is preferably

   [Chem. 17]

the above structure.

In this structure, $S^{M1}$ represents an alkylene group having 1 to 12 carbon atoms or a single bond, and a —CH$_2$— group in the alkylene group may be replaced by an oxygen atom, —COO—, —OCO—, or —OCOO— as long as oxygen atoms are not directly bonded to each other. In a PSA-mode liquid crystal display element, at least one of $S^{M1}$'s is preferably a single bond. Preferably, both of $S^{M1}$'s are single bonds, or one of $S^{M1}$'s is a single bond and the other is an alkylene group having 1 to 8 carbon atoms or —O—(CH$_2$)$_s$—. In this case, an alkylene group having 1 to 4 carbon atoms is preferably used, and s is preferably 1 to 4.

$R^7$ represents any one of the structures represented by Formulae (R-1) to (R-15).

[Chem. 18]

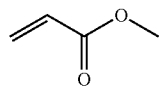 (R-1)

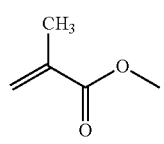 (R-2)

(R-3)

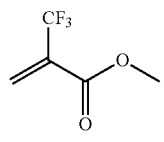 (R-4)

(R-5)

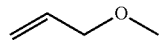 (R-6)

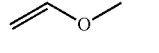 (R-7)

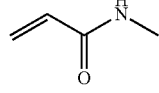 (R-8)

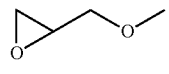 (R-9)

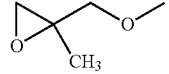 (R-10)

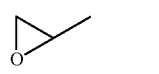

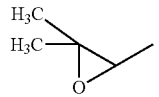

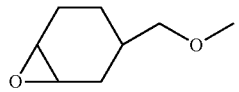 (R-11)

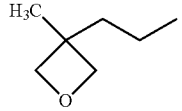 (R-12)

 (R-13)

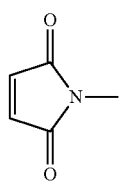 (R-14)

 (R-15)

$R^7$ is preferably the structure represented by Formula (R-1) or (R-2).

$L^{M1}$ and $L^{M2}$ each independently represent a single bond, —O—, —CH$_2$—, —OCH$_2$—, —CH$_2$O—, —CO—, —C$_2$H$_4$—, —COO—, —OCO—, —CH=CH—COO—, —COO—CH=CH—, —OCO—CH=CH—, —CH=CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF=CF—, —CF$_2$—, —CF$_2$O—, —OCF$_2$—, —CF$_2$CH$_2$—, —CH$_2$CF$_2$—, —CF$_2$CF$_2$—, or —C≡C—. In the case where a plurality of $L^{M2}$'s are present, they may be the same or different. $L^{M1}$ and $L^{M2}$ are preferably each independently —COO—, —OCO—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —C≡C—, or a single bond; and are further preferably each independently —COO—, OCO—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, or a single bond.

$M^{M1}$ represents a 1,4-phenylene group, a 1,4-cyclohexylene group, or a naphthalene-2,6-diyl group. A hydrogen atom included in these groups may be replaced by a fluorine atom, a chlorine atom, an alkyl group having 1 to 8 carbon atoms, an alkyl halide group, an alkoxy halide group, an alkoxy group, a nitro group, or

   [Chem. 19]

the above structure.

$m^{M1}$ is 0, 1, or 2 and is preferably 0 or 1.

In the case where a plurality of $X^{M1}$'s to $X^{M1}$'s, $S^{M1}$'s, $R^{M1}$'s, $L^{M2}$'s, and/or $M^{M1}$'s are present, they may be the same or different.

More specifically, the liquid crystal composition according to the present invention preferably includes one or more polymerizable compounds represented by General Formula (IV), which have a ring structure corresponding to the structure of a polymerizable compound represented by General Formula (RM-1) in which $L^{M1}$ is a single bond and $m^{M1}$ is 0.

[Chem. 20]

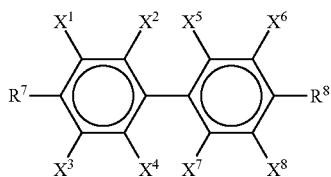
(IV)

In General Formula (IV), $R^7$ and $R^8$ each independently represent any one of the structures represented by Formulae (R-1) to (R-15); and $X^1$ to $X^8$ each independently represent a trifluoromethyl group, a trifluoromethoxy group, a fluorine atom, or a hydrogen atom.

[Chem. 21]

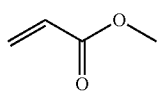
(R-1)

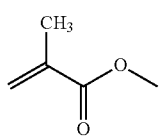
(R-2)

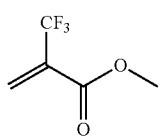
(R-3)

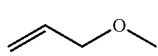
(R-4)

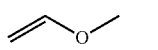
(R-5)

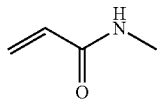
(R-6)

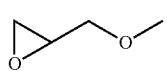
(R-7)

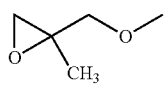
(R-8)

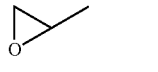
(R-9)

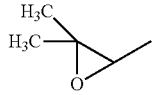
(R-10)

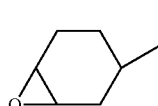
(R-11)

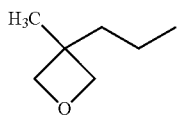
(R-12)

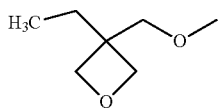
(R-13)

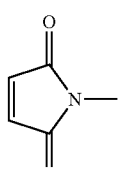
(R-14)

HS—
(R-15)

The structure of the biphenyl skeleton represented in General Formula (IV) is further preferably any one of the structure represented by Formula (XXa-1) and the structures represented by Formulae (IV-11) to (IV-14) and is most preferably the structure represented by Formula (IV-11).

[Chem. 22]

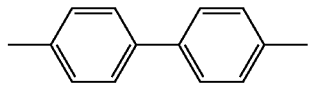
(XXa-1)

[Chem. 23]

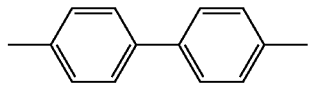
(IV-11)

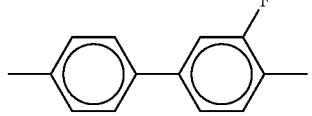
(IV-12)

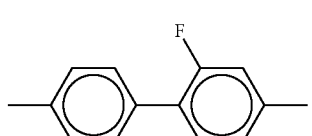
(IV-13)

(IV-14)

A polymerizable compound that includes any one of the skeletons represented by Formulae (IV-11) to (IV-14) optimizes an anchoring force after being polymerized, which improves an alignment state.

The polymerizable compound represented by General Formula (RM-1) which includes any one of the above-described skeletons optimizes, after being polymerized, an anchoring force for a PSA-mode liquid crystal display element, which improves an alignment state. Therefore, such a polymerizable compound reduces or eliminates the risk of display unevenness.

Specifically, the polymerizable compound is preferably any one of the compounds represented by Formulae (XX-1) to (XX-10) and is further preferably any one of the compounds represented by Formulae (XX-1) to (XX-4).

[Chem. 24]

(XX-1)

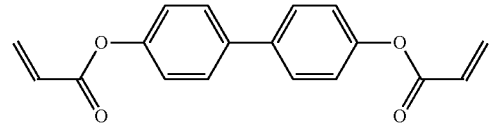
(XX-2)

(XX-3)

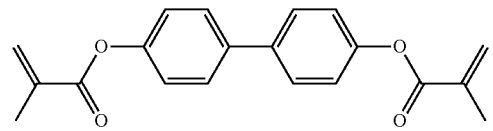
(XX-4)

(XX-5)

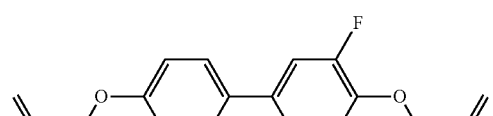
(XX-6)

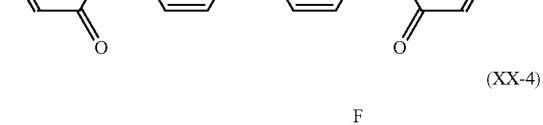
(XX-7)

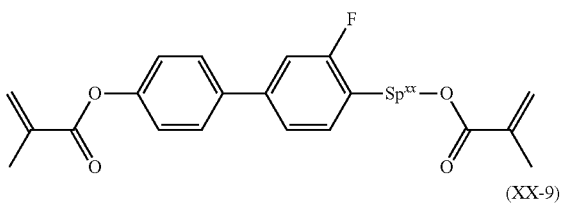
(XX-8)

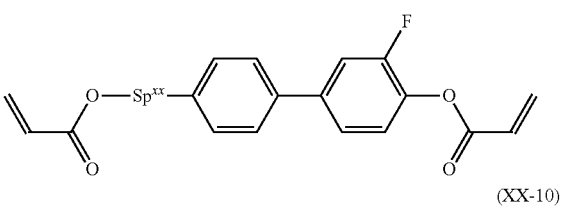
(XX-9)

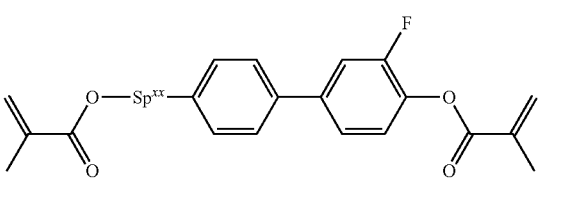
(XX-10)

In Formulae (XX-1) to (XX-10), $Sp^{xx}$ represents an alkylene group having 1 to 8 carbon atoms or $-O-(CH_2)_s-$ (where s is an integer of 2 to 7 and the oxygen atom is bonded to the ring).

For example, the polymerizable compounds represented by Formulae (M31) to (M48), which have a ring structure corresponding to the structure of a polymerizable compound represented by General Formula (RM-1) in which $m^{M1}$ is 1, are also preferably used.

[Chem. 25]

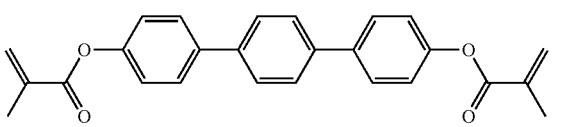
(M31)

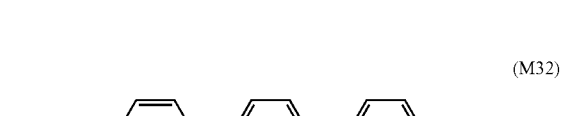
(M32)

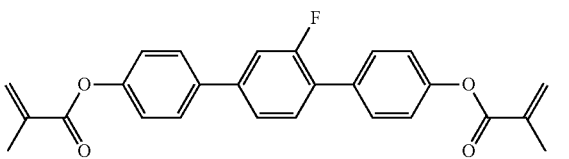
(M33)

(M34)
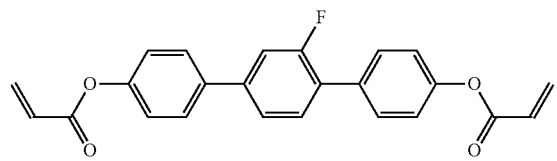

(M35)
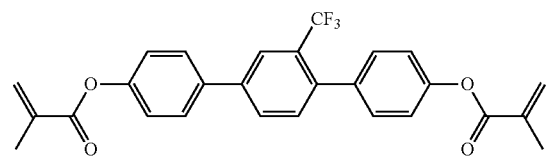

(M36)
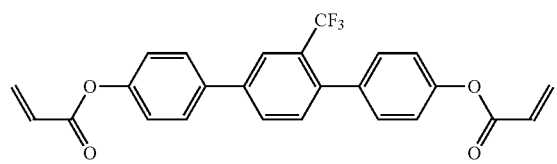

(M37)
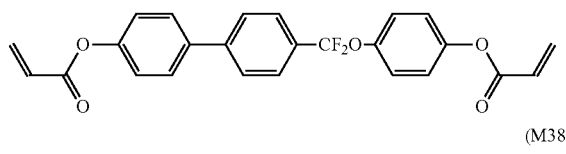

(M38)
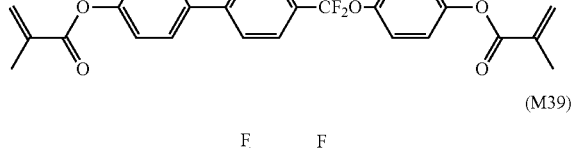

(M39)
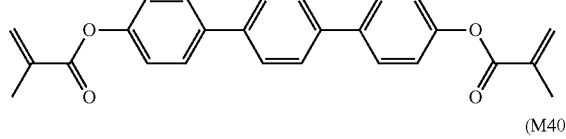

(M40)
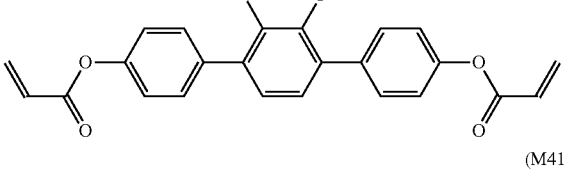

(M41)
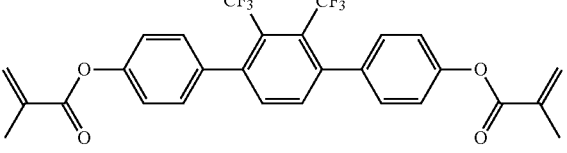

(M42)
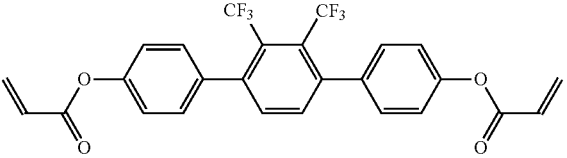

(M43)
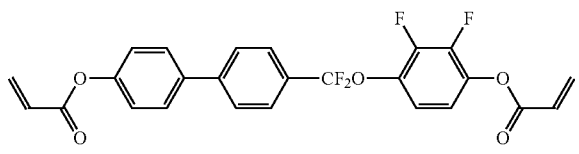

(M44)
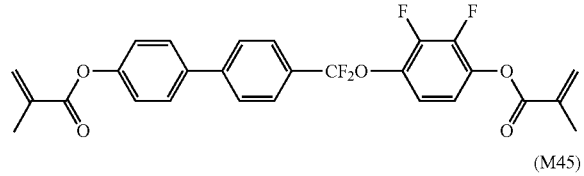

(M45)
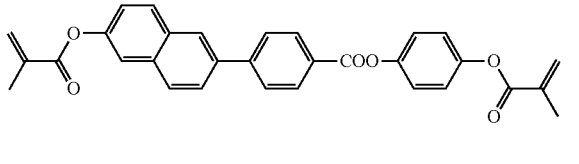

(M46)
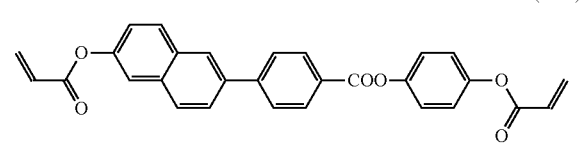

(M47)
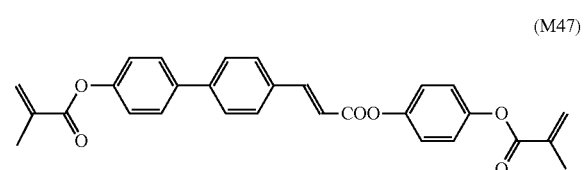

(M48)
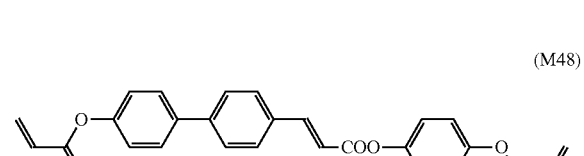

A hydrogen atom of the phenyl group or the naphthalene group represented in Formulae (M31) to (M48) may be replaced by —F, —Cl, —CF$_3$, —CH$_3$, or any one of the structures represented by Formulae (R-1) to (R-15).

The polymerizable compound represented by General Formula (RM-1) which includes any one of the above-described skeletons optimizes, after being polymerized, an anchoring force for a PSA-mode liquid crystal display element, which improves an alignment state. Therefore, such a polymerizable compound reduces or eliminates the risk of display unevenness.

For example, the polymerizable compounds represented by Formulae (M301) to (M316), which have a ring structure corresponding to the structure of a polymerizable compound represented by General Formula (RM-1) in which L$^{M1}$ is a single bond and m$^{M1}$ is 1, are also preferably used.

[Chem. 26]
(M301)
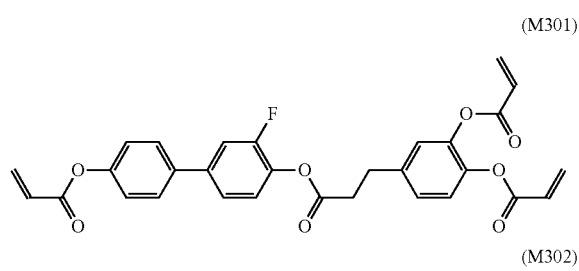
(M302)
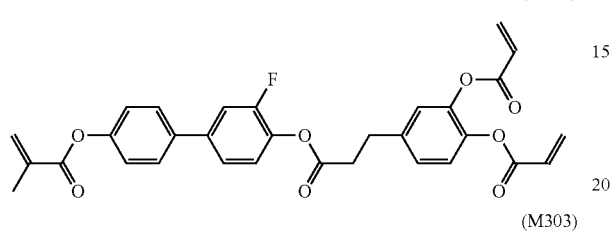
(M303)
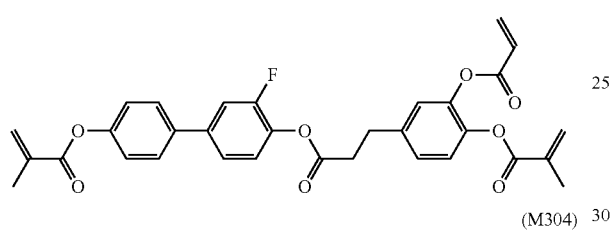
(M304)
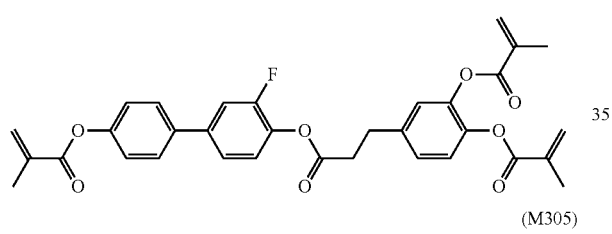
(M305)
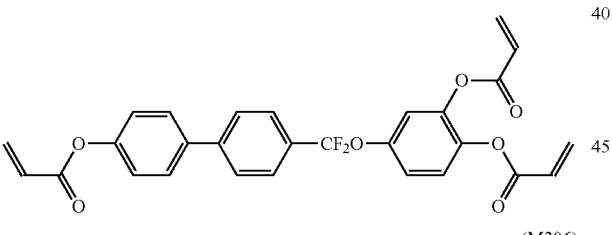
(M306)
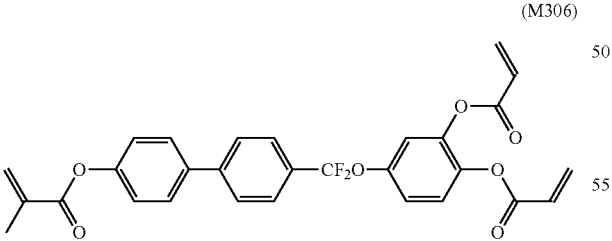
(M307)
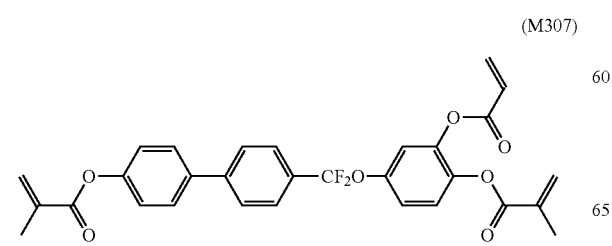
(M308)
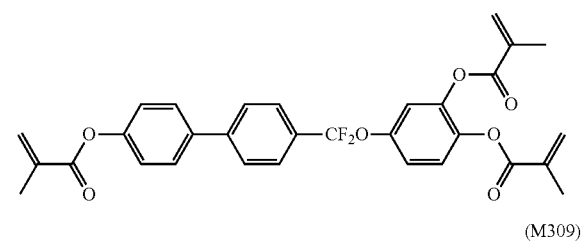
(M309)
(M310)
(M311)
(M312)
(M313)
(M314)
-continued

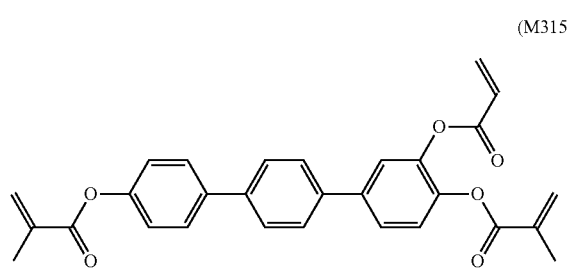
(M315)
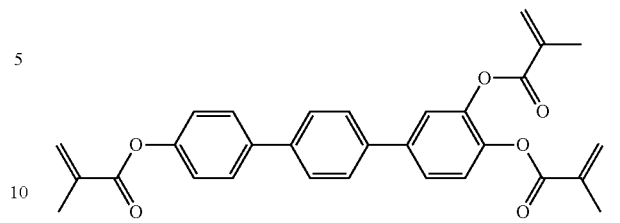
(M316)
Among polymerizable compounds represented by General Formula (RM-1), for example, the polymerizable compounds represented by Formulae (Ia-1) to (Ia-31) are also preferably used.
[Chem. 27]
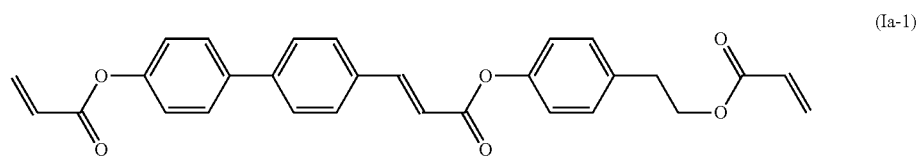
(Ia-1)
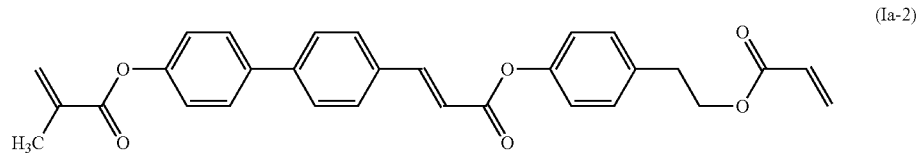
(Ia-2)
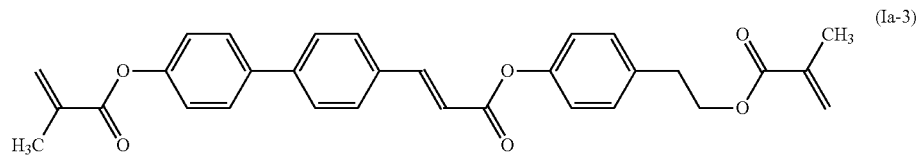
(Ia-3)
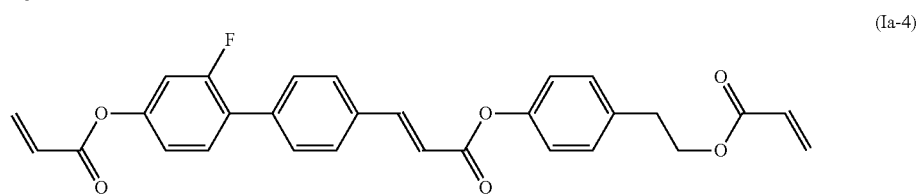
(Ia-4)
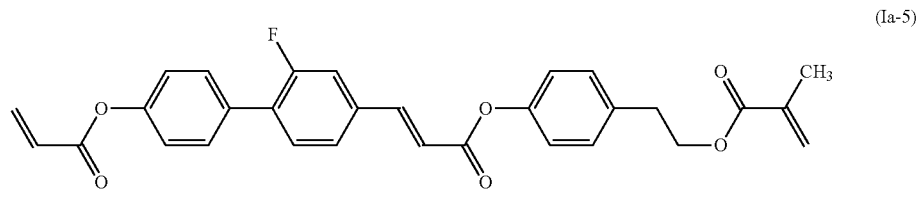
(Ia-5)
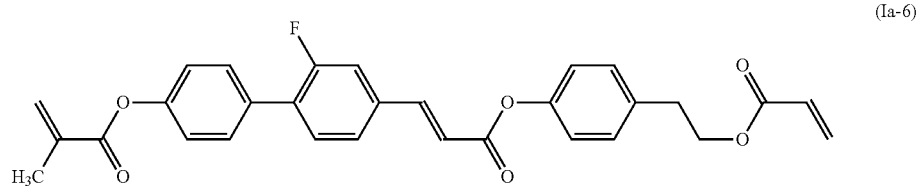
(Ia-6)
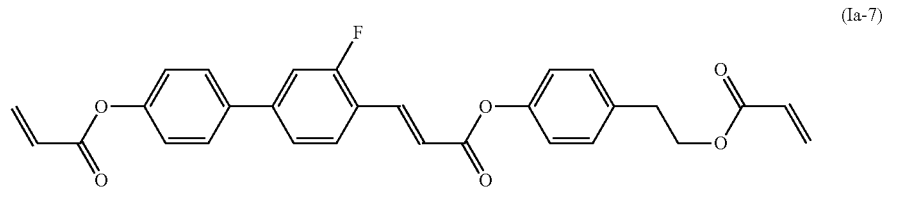
(Ia-7)

-continued
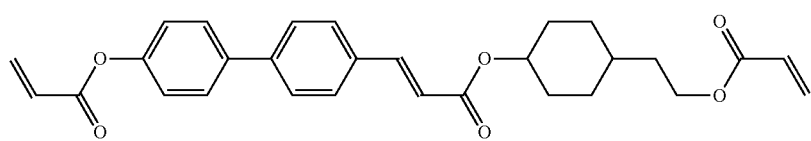
(Ia-8)
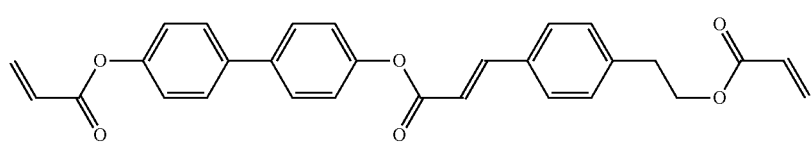
(Ia-9)
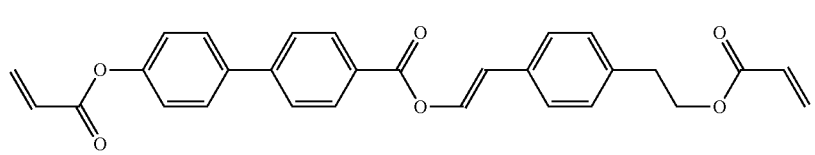
(Ia-10)
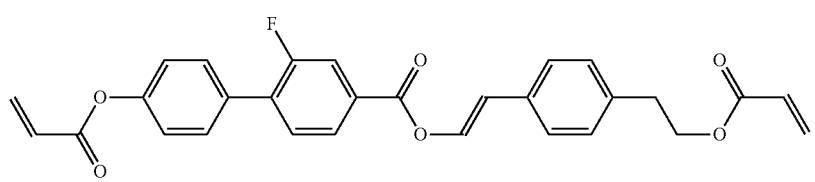
(Ia-11)
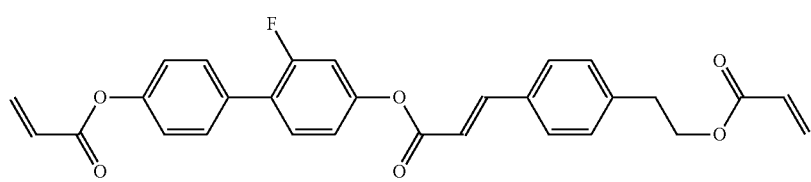
(Ia-12)
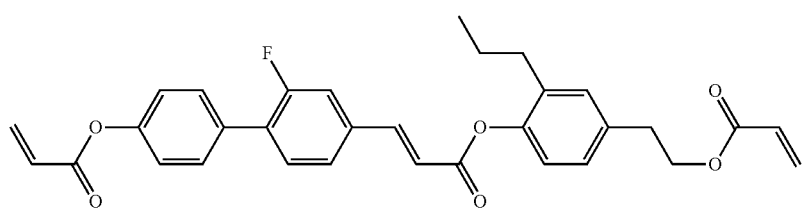
(Ia-13)
[Chem. 28]
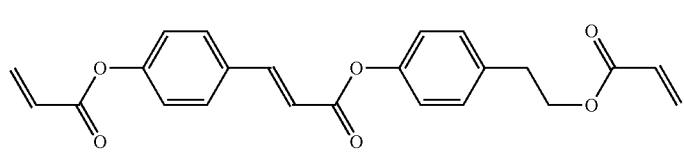
(Ia-14)
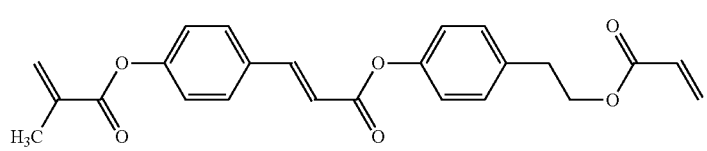
(Ia-15)
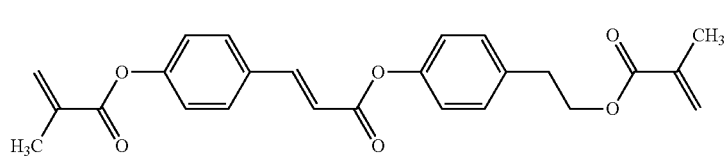
(Ia-16)

-continued
(Ia-17)
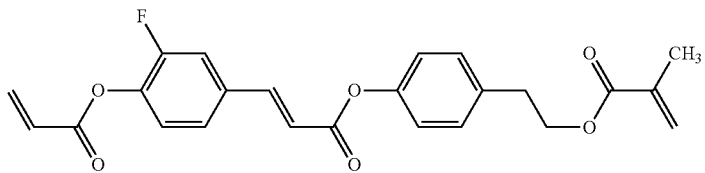
(Ia-18)
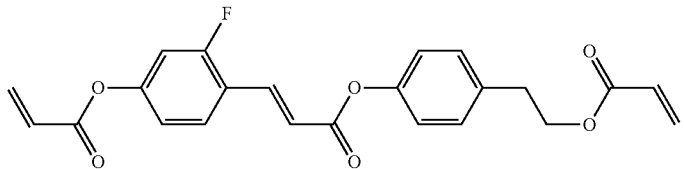
[Chem. 29]
(Ia-19)
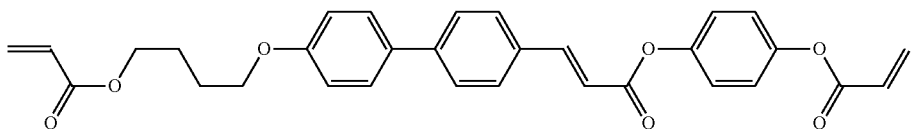
(Ia-20)
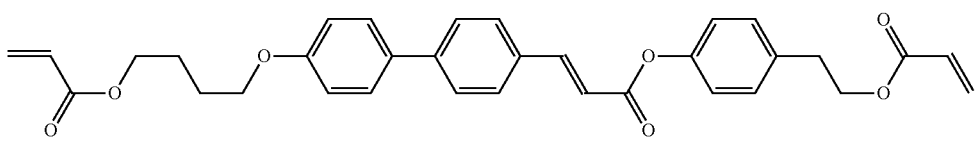
(Ia-21)
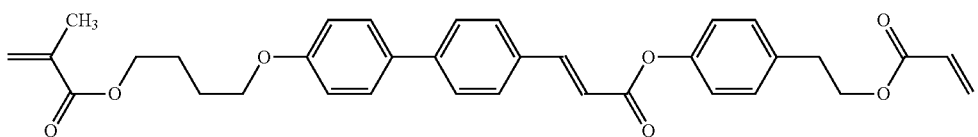
(Ia-22)
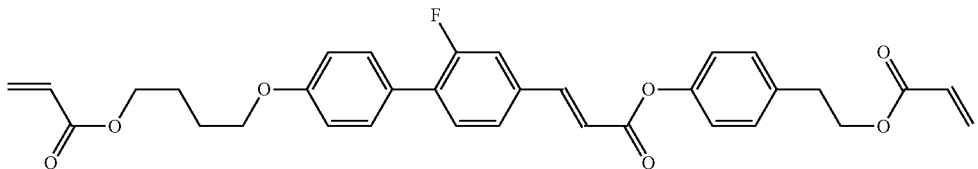
(Ia-23)
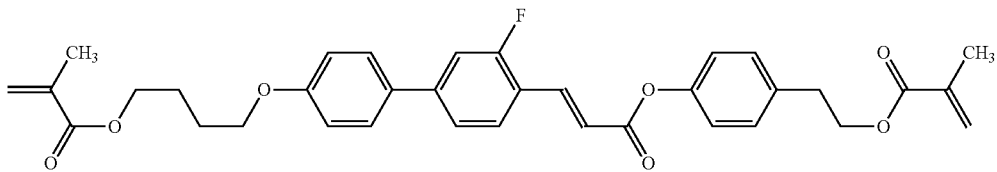
(Ia-24)
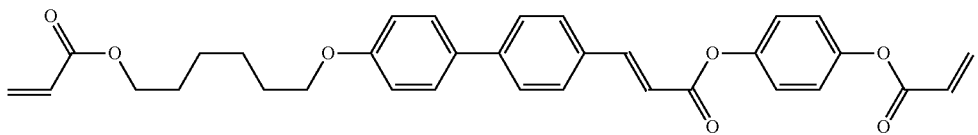
(Ia-25)
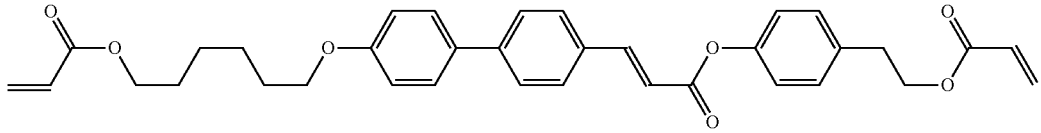

-continued

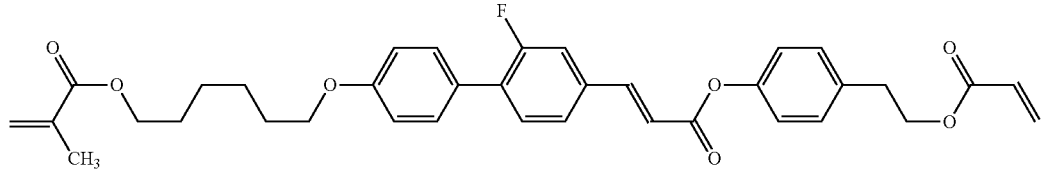
(Ia-26)

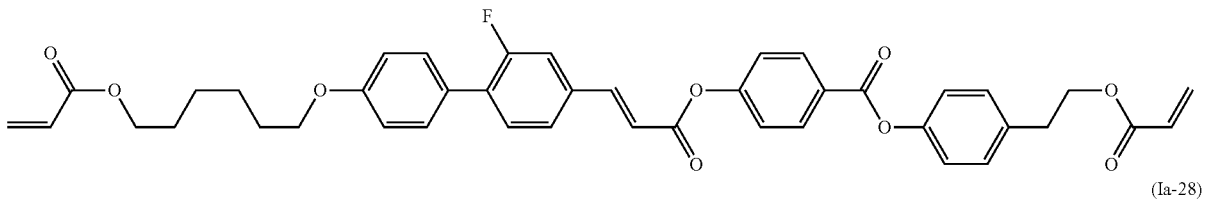
(Ia-27)

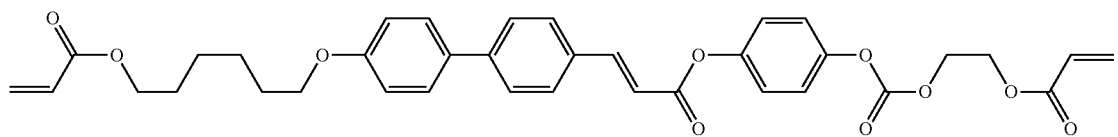
(Ia-28)

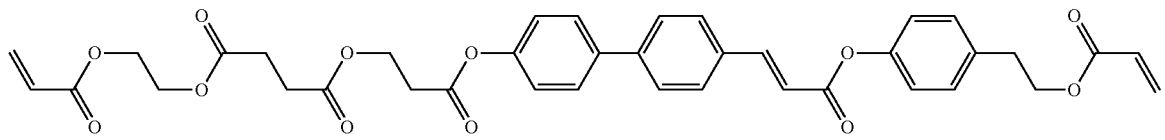
(Ia-29)

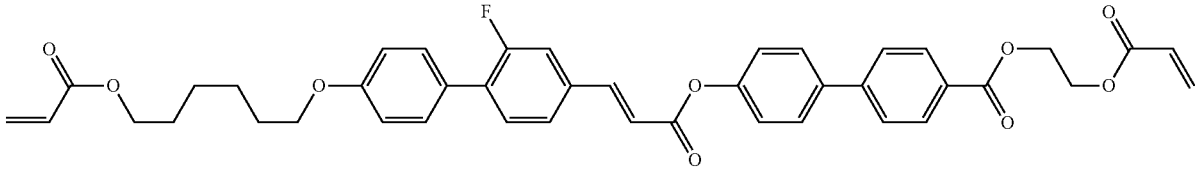
(Ia-30)

[Chem. 30]

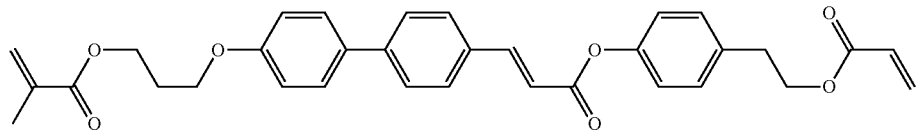
(Ia-31)

If the content of the polymerizable compound is low, the anchoring force for the liquid crystal composition is reduced. On the other hand, if the content of the polymerizable compound is excessively high, energy required for polymerization is increased. Consequently, the amount of polymerizable compound that disadvantageously remains unpolymerized is increased, which may cause a faulty display. Therefore, the content of the polymerizable compound is preferably 0.01% to 2.00% by mass, is further preferably 0.05% to 1.00% by mass, and is most preferably 0.10% to 0.50% by mass.

The polymerizable compound represented by General Formula (RM-1) which includes any one of the above-described skeletons optimizes, after being polymerized, an anchoring force for a PSA-mode liquid crystal display element, which improves an alignment state. Therefore, such a polymerizable compound reduces or eliminates the risk of display unevenness.

The polymerizable compound-containing liquid crystal composition according to the present invention, which includes the first component, the second component, the third component, and the polymerizable compound represented by General Formula (IV), has a low viscosity ($\eta$), a low rotational viscosity ($\gamma_1$), and a high elastic constant ($K_{33}$). Thus, by using the liquid crystal composition, it is possible to provide a liquid crystal display element, such as a PSA-mode or PSVA-mode liquid crystal display element, which realizes a high-speed response.

Having a remarkable high-speed response capability, the liquid crystal display element that includes the liquid crystal composition according to the present invention may be suitably used as a liquid crystal display element for active-matrix driving and may also be used in VA-mode, PSVA-mode, PSA-mode, IPS-mode, or ECB-mode.

EXAMPLES

The present invention is described more in detail with reference to Examples below. However, the present invention is not limited by Examples below. Note that, when referring to compositions in Examples and Comparative examples, "%" always denotes "% by mass".

In Examples, the following abbreviations are used to describe compounds.

(Side Chain)

-n —$C_nH_{2n+1}$ Straight-chain alkyl group having n carbon atoms n- $C_nH_{2n+1}$— Straight-chain alkyl group having n carbon atoms —On —$OC_nH_{2n+1}$ Straight-chain alkoxyl group having n carbon atoms nO— $C_nH_{2n+1}O$— Straight-chain alkoxyl group having n carbon atoms —V —$CH=CH_2$
V— $CH_2=CH$—
—V1 —$CH=CH—CH_3$
1V— $CH_3—CH=CH$—
-2V —$CH_2—CH_2—CH=CH_3$
V2- $CH_3=CH—CH_2—CH_2$—
-2V1 —$CH_2—CH_2—CH=CH—CH_3$
1V2- $CH_3—CH=CH—CH_2—CH_2$ (Ring Structure)

[Chem. 31]

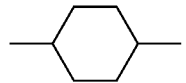
Cy

Ph

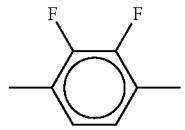
Ph5

The following properties were measured in Examples.

$T_{ni}$: Nematic phase-isotropic liquid phase transition temperature (° C.)

Δn: Refractive index anisotropy at 20° C.

Δ∈: Dielectric anisotropy at 25° C.

η: Viscosity at 20° C. (mPa·s)

$γ_1$: Rotational viscosity at 20° C. (mPa·s)

$K_{33}$: Elastic constant $K_{33}$ at 20° C. (pN)

VHR(UV): Voltage holding ratio (VHR) after UV irradiation of 60 J

Comparative Example 1, Comparative Example 2, Example 1, Example 2, Example 3, and Example 4

Liquid crystal compositions LC-A (Comparative Example 1), LC-D (Comparative Example 2), LC-1 (Example 1), LC-2 (Example 2), LC-3 (Example 3), and LC-4 (Example 4) were prepared, and the physical properties of the liquid crystal compositions were measured. Table 1 summarizes the components of each liquid crystal composition and the measurement results of the physical properties of each liquid crystal composition.

TABLE 1

|  |  | Comparative example 1 LC-A | Comparative example 2 LC-D | Example 1 LC-1 | Example 2 LC-2 | Example 3 LC-3 | Example 4 LC-4 |
|---|---|---|---|---|---|---|---|
| 2-Cy-Cy-V1 | Formula (Ib) |  |  | 20 | 20 | 18 | 18 |
| 3-Cy-Cy-V1 | Formula (Ic) |  |  | 13 | 13 | 13 | 8 |
| 3-Cy-Cy-V | General Formula (III-A) |  | 39 |  |  |  | 5 |
| 3-Cy-Cy-2 | General Formula (III-A) | 18 |  |  |  |  |  |
| 3-Cy-Cy-4 | General Formula (III-A) | 9 |  |  |  |  |  |
| 3-Cy-Cy-5 | General Formula (III-A) | 6 |  |  |  |  |  |
| 3-Ph-Ph-1 | General Formula (III-F) | 8 | 5 | 10 |  | 8 | 8 |
| 5-Ph-Ph-1 | General Formula (III-F) |  | 5 |  | 15 | 11 | 11 |
| 3-Cy-Cy-Ph-1 | General Formula (III-G) | 4 |  |  | 3 |  |  |
| 3-Cy-Ph-Ph-2 | General Formula (III-H) |  |  | 6 | 3 | 7 | 7 |
| 3-Cy-1O-Ph5-O1 | General Formula (II-A1) | 3 |  |  | 2 |  |  |
| 3-Cy-1O-Ph5-O2 | General Formula (II-A1) | 8 | 9 |  | 2 |  |  |
| 1V-Cy-1O-Ph5-O2 | General Formula (II-A1) |  |  | 8 | 2 | 6 | 8 |
| 2-Cy-Cy-1O-Ph5-O2 | General Formula (II-A3) | 13 | 13 | 10 | 10 | 9 | 11 |
| 3-Cy-Cy-1O-Ph5-O2 | General Formula (II-A3) | 13 | 13 | 10 | 10 | 10 | 10 |
| 4-Cy-Cy-1O-Ph5-O2 | General Formula (II-A3) |  | 3 |  |  |  |  |
| V-Cy-Cy-1O-Ph5-O2 | General Formula (II-A3) |  |  | 10 | 10 | 4 | 4 |
| 1V-Cy-Cy-1O-Ph5-O2 | General Formula (II-A3) |  |  | 4 | 4 | 10 | 10 |
| 3-Cy-Ph5-O2 | General Formula (II-B1) |  |  |  |  | 2 |  |
| 3-Ph-Ph5-O2 | General Formula (II-B2) |  |  |  | 2 |  |  |
| 3-Cy-Cy-Ph5-O2 | General Formula (II-B3) |  |  |  |  | 2 |  |
| 2-Cy-Ph-Ph5-O2 | General Formula (II-B4) |  |  |  | 2 |  |  |
| 3-Cy-Ph-Ph5-O3 | General Formula (II-B4) |  |  |  | 2 |  |  |
| 3-Ph-Ph5-Ph-1 | General Formula (V) | 5 | 4 |  |  |  |  |
| 3-Ph-Ph5-Ph-2 | General Formula (V) | 13 | 14 | 4 |  |  |  |
| Total |  | 100 | 100 | 100 | 100 | 100 | 100 |
| Tni [° C.] |  | 75.1 | 75.1 | 75.4 | 75.3 | 75.1 | 75.5 |
| Δn |  | 0.108 | 0.109 | 0.109 | 0.109 | 0.110 | 0.109 |
| η [mPa · s] |  | 18.1 | 15.2 | 14.9 | 14.8 | 14.5 | 14.2 |
| γ1 [mPa · s] |  | 120 | 100 | 110 | 109 | 113 | 107 |

TABLE 1-continued

|  | Comparative example 1<br>LC-A | Comparative example 2<br>LC-D | Example 1<br>LC-1 | Example 2<br>LC-2 | Example 3<br>LC-3 | Example 4<br>LC-4 |
|---|---|---|---|---|---|---|
| $\Delta\epsilon$ | −3.1 | −3.1 | −3.1 | −3.1 | −3.1 | −3.1 |
| K33 [pN] | 13.6 | 14.1 | 16.1 | 16.3 | 16.5 | 16.1 |
| $\gamma_1$/K33 | 8.8 | 7.1 | 6.8 | 6.7 | 6.8 | 6.6 |
| VHR (UV) [%] | 94 | 78 | 88 | 91 | 93 | 86 |

The liquid crystal compositions LC-1, LC-2, LC-3, and LC-4 according to the present invention had a low viscosity ($\eta$), a low rotational viscosity ($\gamma_1$), and a high elastic constant ($K_{33}$). The values of $\gamma_1/K_{33}$ of the liquid crystal compositions LC-1, LC-2, LC-3, and LC-4 were 6.8, 6.7, 6.8, and 6.6, respectively, which were sufficiently smaller than those of the liquid crystal compositions LC-A and LC-D, which are comparative examples.

The response speeds of liquid crystal display elements each including the corresponding one of these liquid crystal compositions were measured. The response speeds of the liquid crystal display elements each including the corresponding one of the liquid crystal compositions LC-1, LC-2, LC-3, and LC-4 were higher than that of the liquid crystal display element including the liquid crystal composition LC-A by about 20% to about 25% and were higher than that of the liquid crystal display element including the liquid crystal composition LC-D by about 5% to about 10%. The thickness of the cell used was 3.5 um, and the alignment film used was JALS2096. The measurement of response speeds was conducted at a Von of 5.5 V, a Voff of 1.0 V, and a temperature of 20° C. using DMS301 produced by AUTRONIC-MELCHERS.

The voltage holding ratios after UV irradiation (VHR (UV)) of the liquid crystal display elements were measured. The voltage holding ratios after UV irradiation (VHR(UV)) of the liquid crystal display elements each including the corresponding one of the liquid crystal compositions LC-1, LC-2, LC-3, and LC-4 were higher than that of the liquid crystal display element including the liquid crystal composition LC-D by about 10%. The thickness of the cell used was 6 um, and the alignment film used was AL-1051. The measurement of VHRs was conducted at a voltage of 1 V, a frequency of 6 Hz, and a temperature of 60° C. using VHR-1 produced by TOYO Corporation.

To each of the liquid crystal compositions LC-2 and LC-4 according to the present invention, 0.3% of the polymerizable compound (XX-4) was added, and UV irradiation was performed to prepare a "PSA-mode" liquid crystal display element. It was confirmed that the liquid crystal display elements realized a high-speed response and had high VHRs. It was confirmed that the same results were obtained in the case where the amount of polymerizable compound added was changed to 0.4%.

To each of the liquid crystal compositions LC-2 and LC-4 according to the present invention, 0.3% of the polymerizable compound (M302) was added, and UV irradiation was performed to prepare a "PSA-mode" liquid crystal display element. It was confirmed that the liquid crystal display elements realized a high-speed response and had high VHRs. It was confirmed that the same results were obtained in the case where the amount of polymerizable compound added was changed to 0.4%.

To each of the liquid crystal compositions LC-2 and LC-4 according to the present invention, 0.3% of the polymerizable compound (XX-4) and 0.1% of the polymerizable compound (Ia-31) were added, and UV irradiation was performed to prepare a "PSA-mode" liquid crystal display element. It was confirmed that the liquid crystal display elements realized a high-speed response and had high VHRs. To each of the liquid crystal compositions LC-2 and LC-4 according to the present invention, 0.35% of the polymerizable compound (XX-4) and 0.05% of the polymerizable compound (Ia-31) were added, and UV irradiation was performed to prepare a "PSA-mode" liquid crystal display element. It was confirmed that the liquid crystal display elements realized a high-speed response and had high VHRs. To each of the liquid crystal compositions LC-2 and LC-4 according to the present invention, 0.35% of the polymerizable compound (M302) and 0.05% of the polymerizable compound (Ia-31) were added, and UV irradiation was performed to prepare a "PSA-mode" liquid crystal display element. It was confirmed that the liquid crystal display elements realized a high-speed response and had high VHRs. To each of the liquid crystal compositions LC-2 and LC-4 according to the present invention, 0.35% of the polymerizable compound (M302) and 0.05% of the polymerizable compound (XX-2) were added, and UV irradiation was performed to prepare a "PSA-mode" liquid crystal display element. It was confirmed that the liquid crystal display elements realized a high-speed response and had high VHRs.

To each of the liquid crystal compositions LC-2 and LC-4 according to the present invention, 0.2% of the polymerizable compound (M302) and 0.2% of the polymerizable compound (XX-2) were added, and UV irradiation was performed to prepare a "PSA-mode" liquid crystal display element. It was confirmed that the liquid crystal display elements realized a high-speed response and had high VHRs.

To each of the liquid crystal compositions LC-2 and LC-4 according to the present invention, 0.2% of the polymerizable compound (XX-4) and 0.2% of the polymerizable compound (XX-2) were added, and UV irradiation was performed to prepare a "PSA-mode" liquid crystal display element. It was confirmed that the liquid crystal display elements realized a high-speed response and had high VHRs.

To each of the liquid crystal compositions LC-2 and LC-4 according to the present invention, 0.2% of the polymerizable compound (XX-1) and 0.2% of the polymerizable compound (XX-2) were added, and UV irradiation was performed to prepare a "PSA-mode" liquid crystal display element. It was confirmed that the liquid crystal display elements realized a high-speed response and had high VHRs.

To each of the liquid crystal compositions LC-2 and LC-4 according to the present invention, 0.2% of the polymerizable compound (XX-3) and 0.2% of the polymerizable compound (XX-4) were added, and UV irradiation was performed to prepare a "PSA-mode" liquid crystal display element. It was confirmed that the liquid crystal display elements realized a high-speed response and had high VHRs.

To each of the liquid crystal compositions LC-2 and LC-4 according to the present invention, 0.1% of the polymerizable compound (M31), 0.1% of the polymerizable compound (M32), and 0.1% of the polymerizable compound (M33)

were added, and UV irradiation was performed to prepare a "PSA-mode" liquid crystal display element. It was confirmed that the liquid crystal display elements realized a high-speed response and had high VHRs.

Comparative Example 3, Example 5, and Example 6

Liquid crystal compositions LC-E (Comparative Example 3), LC-5 (Example 5), and LC-6 (Example 6) were prepared, and the physical properties of the liquid crystal compositions were measured. Table 2 summarizes the components of each liquid crystal composition and the measurement results of the physical properties of each liquid crystal composition.

TABLE 2

|   |   | Comparative example 3 LC-E | Example 5 LC-5 | Example 6 LC-6 |
|---|---|---|---|---|
| 3-Ph-Ph-1 | General Formula (III-F) | 3 | 5 | 3 |
| 5-Ph-Ph-1 | General Formula (III-F) | — | 3 | 3 |
| 3-Cy-Cy-2 | General Formula (III-A) | 18 | 3 | 3 |
| 3-Cy-Cy-4 | General Formula (III-A) | 8 | 3 | 3 |
| 3-Cy-Cy-V | General Formula (III-A) | 3 | 3 | 5 |
| 5-Cy-Cy-V | General Formula (III-A) | 3 | 2 | — |
| 2-Cy-Cy-V1 | Formula (Ib) | — | 10 | 10 |
| 3-Cy-Cy-V1 | Formula (Ic) | — | 10 | 10 |
| 3-Cy-Ph5-O2 | General Formula (II-B1) | 8 | 9 | 9 |
| 3-Ph-Ph5-O2 | General Formula (II-B2) | — | — | 2 |
| 2-Cy-Cy-Ph5-O1 | General Formula (II-B3) | 11 | 10 | 10 |
| 2-Cy-Cy-Ph5-O2 | General Formula (II-B3) | 11 | 10 | 10 |
| 3-Cy-Cy-Ph5-O2 | General Formula (II-B3) | 11 | 10 | 10 |
| 3-Cy-Ph-Ph5-O2 | General Formula (II-B4) | 3 | 6 | 6 |
| 3-Cy-Ph-Ph5-O3 | General Formula (II-B4) | 3 | 6 | 6 |
| 3-Ph-Ph5-Ph-1 | General Formula (V) | 6 | 5 | 3 |
| 3-Ph-Ph5-Ph-2 | General Formula (V) | 12 | 5 | 3 |
| 1V2-Ph-Ph5-Ph-2V1 | General Formula (V) | — | — | 4 |
| Total |   | 100 | 100 | 100 |
| Tni [° C.] |   | 82 | 81 | 82 |
| Δn |   | 0.109 | 0.110 | 0.111 |
| η [mPa · s] |   | 23.1 | 19.7 | 19.5 |
| γ1 [mPa · s] |   | 123 | 117 | 115 |
| Δε |   | −2.8 | −2.8 | −2.9 |
| K33 [pN] |   | 11.5 | 13.3 | 13.6 |
| γ1/K33 |   | 10.7 | 8.8 | 8.5 |

The liquid crystal compositions LC-5 and LC-6 according to the present invention had a low viscosity (η), a low rotational viscosity (γ$_1$), and a high elastic constant (K$_{33}$). The values of γ$_1$/K$_{33}$ of the liquid crystal compositions LC-5 and LC-6 were 8.8 and 8.5, respectively, which were sufficiently smaller than that of the liquid crystal composition LC-E, which is a comparative example.

The response speeds of liquid crystal display elements each including the corresponding one of these liquid crystal compositions were measured. The response speeds of the liquid crystal display elements each including the corresponding one of the liquid crystal compositions LC-5 and LC-6 were higher than that of the liquid crystal display element including the liquid crystal composition LC-E by about 20%. The thickness of the cell used was 3.5 um, and the alignment film used was JALS2096. The measurement of response speeds was conducted at a Von of 5.5 V, a Voff of 1.0 V, and a temperature of 20° C. using DMS301 produced by AUTRONIC-MELCHERS.

The voltage holding ratios after UV irradiation (VHR (UV)) of the liquid crystal display elements were measured. The voltage holding ratios after UV irradiation (VHR(UV)) of the liquid crystal display elements each including the corresponding one of the liquid crystal compositions LC-5 and LC-6 were sufficiently high. The thickness of the cell used was 6 um, and the alignment film used was AL-1051. The measurement of VHRs was conducted at a voltage of 1 V, a frequency of 6 Hz, and a temperature of 60° C. using VHR-1 produced by TOYO Corporation.

To each of the liquid crystal compositions LC-5 and LC-6 according to the present invention, 0.3% of the polymerizable compound (XX-4) was added, and UV irradiation was performed to prepare a "PSA-mode" liquid crystal display element. It was confirmed that the liquid crystal display elements realized a high-speed response and had high VHRs. It was confirmed that the same results were obtained in the case where the amount of polymerizable compound added was changed to 0.4%.

To each of the liquid crystal compositions LC-5 and LC-6 according to the present invention, 0.3% of the polymerizable compound (M302) was added, and UV irradiation was performed to prepare a "PSA-mode" liquid crystal display element. It was confirmed that the liquid crystal display elements realized a high-speed response and had high VHRs. It was confirmed that the same results were obtained in the case where the amount of polymerizable compound added was changed to 0.4%.

To each of the liquid crystal compositions LC-5 and LC-6 according to the present invention, 0.3% of the polymerizable compound (XX-4) and 0.1% of the polymerizable compound (Ia-31) were added, and UV irradiation was performed to prepare a "PSA-mode" liquid crystal display element. It was confirmed that the liquid crystal display elements realized a high-speed response and had high VHRs.

To each of the liquid crystal compositions LC-5 and LC-6 according to the present invention, 0.35% of the polymerizable compound (XX-4) and 0.05% of the polymerizable compound (Ia-31) were added, and UV irradiation was performed to prepare a "PSA-mode" liquid crystal display element. It was confirmed that the liquid crystal display elements realized a high-speed response and had high VHRs.

To each of the liquid crystal compositions LC-5 and LC-6 according to the present invention, 0.35% of the polymerizable compound (M302) and 0.05% of the polymerizable compound (Ia-31) were added, and UV irradiation was performed to prepare a "PSA-mode" liquid crystal display element. It was confirmed that the liquid crystal display elements realized a high-speed response and had high VHRs.

To each of the liquid crystal compositions LC-5 and LC-6 according to the present invention, 0.35% of the polymerizable compound (M302) and 0.05% of the polymerizable compound (XX-2) were added, and UV irradiation was performed to prepare a "PSA-mode" liquid crystal display element. It was confirmed that the liquid crystal display elements realized a high-speed response and had high VHRs.

To each of the liquid crystal compositions LC-5 and LC-6 according to the present invention, 0.2% of the polymerizable compound (M302) and 0.2% of the polymerizable compound (XX-2) were added, and UV irradiation was performed to prepare a "PSA-mode" liquid crystal display element. It was confirmed that the liquid crystal display elements realized a high-speed response and had high VHRs.

To each of the liquid crystal compositions LC-5 and LC-6 according to the present invention, 0.2% of the polymerizable compound (XX-4) and 0.2% of the polymerizable compound (XX-2) were added, and UV irradiation was performed to prepare a "PSA-mode" liquid crystal display element. It was confirmed that the liquid crystal display elements realized a high-speed response and had high VHRs.

To each of the liquid crystal compositions LC-5 and LC-6 according to the present invention, 0.2% of the polymerizable compound (XX-1) and 0.2% of the polymerizable compound (XX-2) were added, and UV irradiation was performed to prepare a "PSA-mode" liquid crystal display element. It was confirmed that the liquid crystal display elements realized a high-speed response and had high VHRs.

To each of the liquid crystal compositions LC-5 and LC-6 according to the present invention, 0.2% of the polymerizable compound (XX-3) and 0.2% of the polymerizable compound (XX-4) were added, and UV irradiation was performed to prepare a "PSA-mode" liquid crystal display element. It was confirmed that the liquid crystal display elements realized a high-speed response and had high VHRs.

To each of the liquid crystal compositions LC-5 and LC-6 according to the present invention, 0.1% of the polymerizable compound (M31), 0.1% of the polymerizable compound (M32), and 0.1% of the polymerizable compound (M33) were added, and UV irradiation was performed to prepare a "PSA-mode" liquid crystal display element. It was confirmed that the liquid crystal display elements realized a high-speed response and had high VHRs.

On the basis of the above-described results, it was confirmed that the liquid crystal composition according to the present invention has a high voltage holding ratio (VHR) and a sufficiently low $\gamma 1/K_{33}$ and that, by using the liquid crystal composition, it is possible to provide a liquid crystal display element, such as a VA-type liquid crystal display element, which eliminates or reduces the risk of a faulty display and realizes high display quality and a high-speed response.

The invention claimed is:

1. A liquid crystal composition comprising:
   as a first component, a compound represented by Formula (Ib) and a compound represented by Formula (Ic), the content of the compound represented by Formula (Ib) being 10% to 30% by mass, the total content of the first component being 15% to 45% by mass,

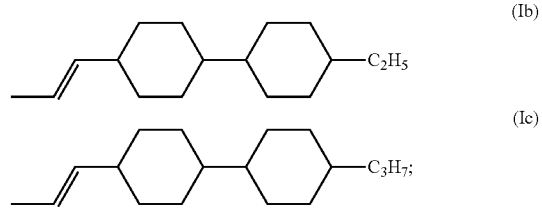

and,
   as a second component, a compound having a negative dielectric anisotropy ($\Delta\in$), the absolute value of the dielectric anisotropy being more than 3.

2. The liquid crystal composition according to claim 1, having a dielectric anisotropy ($\Delta\in$) of −2.0 to −8.0 at 25° C., a refractive index anisotropy ($\Delta$n) of 0.08 to 0.14 at 20° C., a viscosity ($\eta$) of 10 to 30 mPa·s at 20° C., a rotational viscosity ($\gamma 1$) of 60 to 130 mPa·s at 20° C., and a nematic phase-isotropic liquid phase transition temperature ($T_{ni}$) of 60° C. to 120° C.

3. The liquid crystal composition according to claim 1, wherein the second component is one or more compounds selected from compounds represented by General Formula (II):

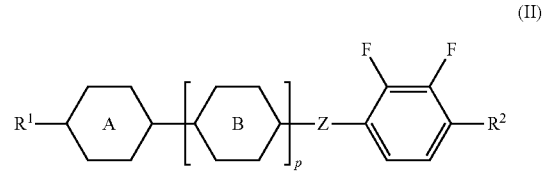

(wherein $R^1$ and $R^2$ each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms; one —$CH_2$— group included in $R^1$ and $R^2$ or two or more —$CH_2$— groups that are included in $R^1$ and $R^2$ and are not adjacent to each other may be each independently replaced by —O— and/or —S—; one or more hydrogen atoms included in $R^1$ and $R^2$ may be each independently replaced by a fluorine atom or a chlorine atom; the rings A and B each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group; p is 0, 1, or 2; and Z represents —$OCH_2$—, —$CH_2O$—, —$CF_2O$—, —$OCF_2$—, —$CH_2CH_2$—, —$CF_2CF_2$—, or a single bond).

4. The liquid crystal composition according to claim 1, wherein the content of the second component is 10% to 90% by mass.

5. The liquid crystal composition according to claim 3, wherein General Formula (II) representing the second component is any one of General Formulae (II-A1) to (II-A5) and General Formulae (II-B1) to (II-B5):

(II-A1) 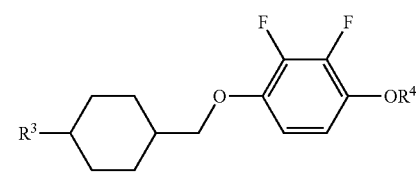

(II-A2) 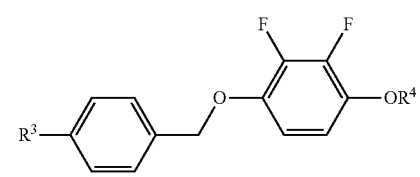

(II-A3) 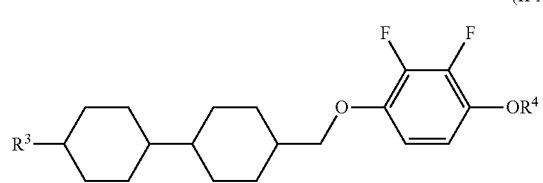

(II-A4) 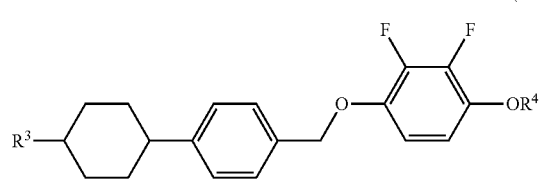

(II-A5) 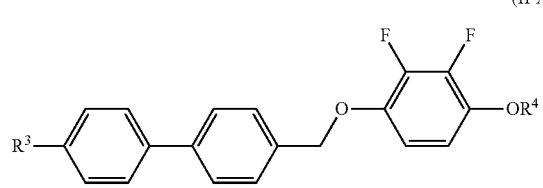

(II-B1) 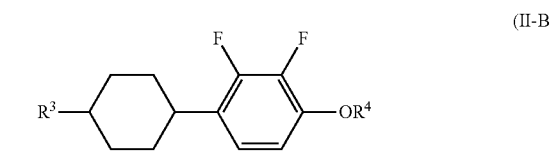

(II-B2) 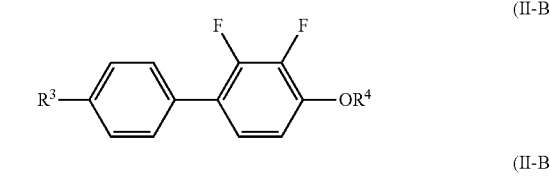

(II-B3) 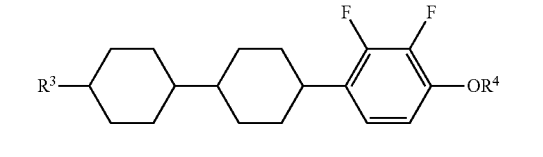

(II-B4) 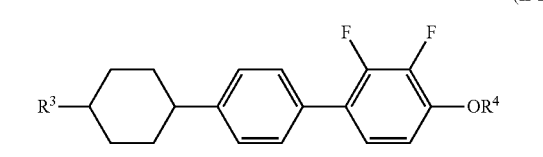

(II-B5) 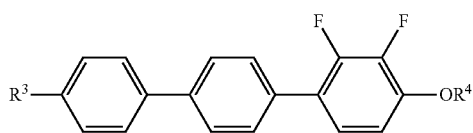

(wherein $R^3$ and $R^4$ each independently represent an alkyl group having 1 to 5 carbon atoms or an alkenyl group having 2 to 5 carbon atoms; and one or more hydrogen atoms included in $R^3$ and $R^4$ may be each independently replaced by a fluorine atom).

6. The liquid crystal composition according to claim 5, wherein the second component is one or more compounds selected from compounds represented by General Formulae (II-A1) to (II-A5).

7. The liquid crystal composition according to claim 1, further comprising, as a third component, one or more compounds selected from compounds represented by General Formulae (III-A) to (III-J):

(III-A) 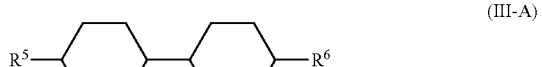

(III-B) 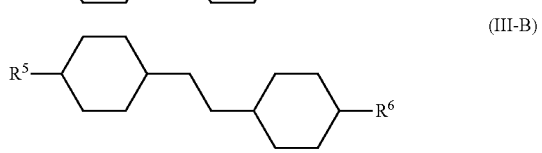

(III-C) 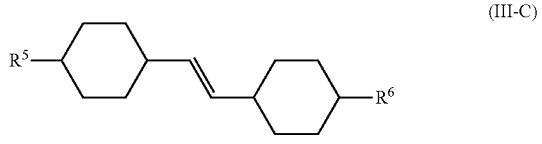

(III-D) 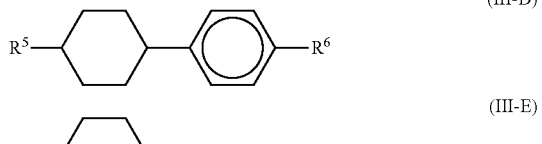

(III-E) 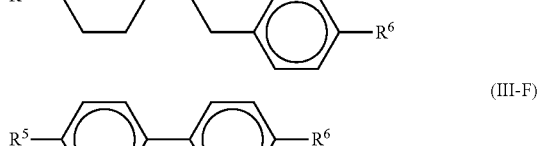

(III-F) 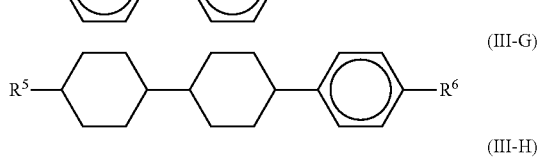

(III-G) 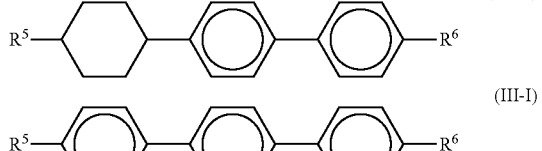

(III-H) 

(III-I) 

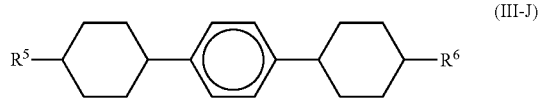
(III-J)

(wherein $R^5$ represents an alkyl group having 1 to 5 carbon atoms or an alkenyl group having 2 to 5 carbon atoms; and $R^6$ represents an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms; and a compound represented by General Formula (III-A) is different from the compound represented by Formula (Ib) and the compound represented by Formula (Ic)).

8. The liquid crystal composition according to claim 1, wherein the second component is any one of General Formulae (II-A1) to (II-A5) and General Formulae (II-B1) to (II-B5):

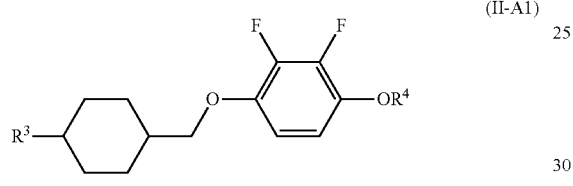
(II-A1)

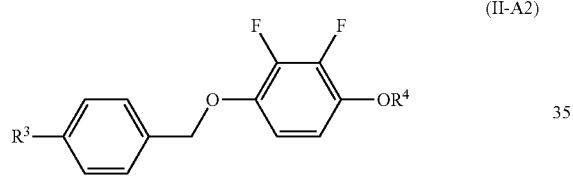
(II-A2)

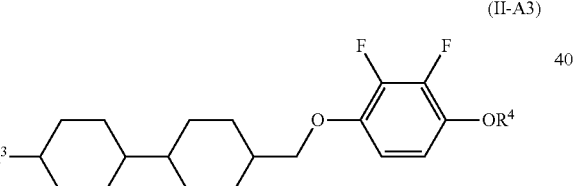
(II-A3)

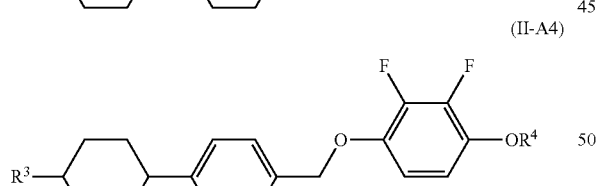
(II-A4)

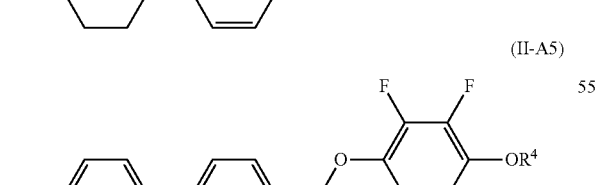
(II-A5)

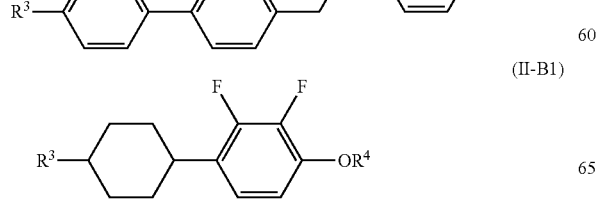
(II-B1)

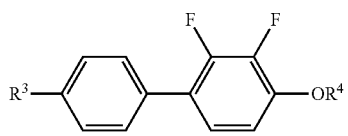
(II-B2)

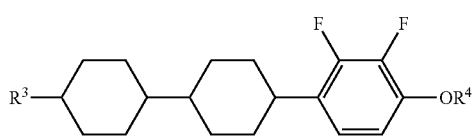
(II-B3)

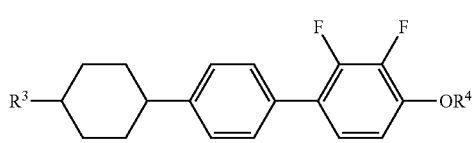
(II-B4)

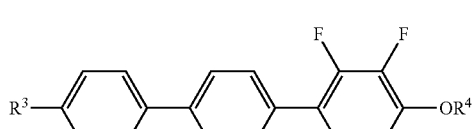
(II-B5)

(wherein $R^3$ and $R^4$ each independently represent an alkyl group having 1 to 5 carbon atoms or an alkenyl group having 2 to 5 carbon atoms; and one or more hydrogen atoms included in $R^3$ and $R^4$ may be each independently replaced by a fluorine atom), and wherein the liquid crystal composition further comprises, as a third component, one or more compounds selected from compounds represented by General Formulae (III-A) to (III-J):

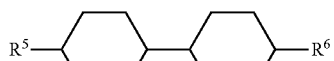
(III-A)

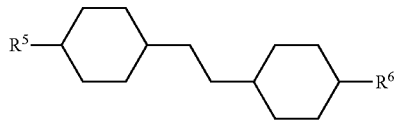
(III-B)

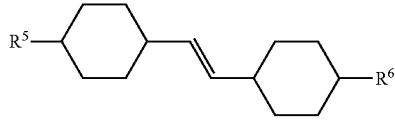
(III-C)

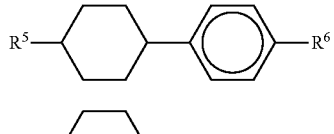
(III-D)

(III-E)

(III-F)

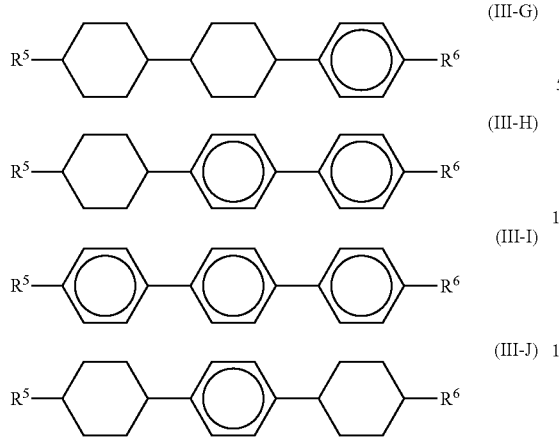

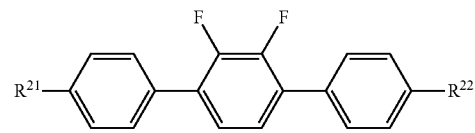

(wherein $R^{21}$ and $R^{22}$ each independently represent an alkyl group having 1 to 8 carbon atoms, an alkoxyl group having 1 to 8 carbon atoms, an alkenyl group having 2 to 8 carbon atoms, or an alkenyloxyl group having 2 to 8 carbon atoms).

16. The liquid crystal composition according to claim 1, including one or more polymerizable compounds.

17. The liquid crystal composition according to claim 16, wherein the polymerizable compounds are represented by General Formula (RM-1):

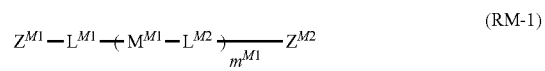

(wherein $Z^{M1}$ and $Z^{M2}$ each independently represent the following structure:

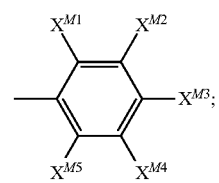

(wherein $R^5$ represents an alkyl group having 1 to 5 carbon atoms or an alkenyl group having 2 to 5 carbon atoms; and $R^6$ represents an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms; and a compound represented by General Formula (III-A) is different from the compound represented by Formula (Ib) and the compound represented by Formula (Ic)).

9. The liquid crystal composition according to claim 8, including the compound represented by Formula (Ib), the compound represented by Formula (Ic), a compound represented by General Formula (II-A1), and a compound represented by General Formula (III-A).

10. The liquid crystal composition according to claim 8, including the compound represented by Formula (Ib), the compound represented by Formula (Ic), a compound represented by General Formula (II-A3), and a compound represented by General Formula (III-A).

11. The liquid crystal composition according to claim 8, including the compound represented by Formula (Ib), the compound represented by Formula (Ic), a compound represented by General Formula (II-B1), and a compound represented by General Formula (III-A).

12. The liquid crystal composition according to claim 8, including the compound represented by Formula (Ib), the compound represented by Formula (Ic), a compound represented by General Formula (II-B2), and a compound represented by General Formula (III-A).

13. The liquid crystal composition according to claim 8, including the compound represented by Formula (Ib), the compound represented by Formula (Ic), a compound represented by General Formula (II-B3), and a compound represented by General Formula (III-A).

14. The liquid crystal composition according to claim 8, including the compound represented by Formula (Ib), the compound represented by Formula (Ic), a compound represented by General Formula (II-B4), and a compound represented by General Formula (III-A).

15. The liquid crystal composition according to claim 1, further comprising, as another component, one or more compounds selected from compounds represented by General Formula (V):

$X^{M1}$ to $X^{M5}$ each independently represent a hydrogen atom, a fluorine atom, or the following structure:

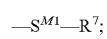

at least one of $X^{M1}$ to $X^{M5}$ represents the following structure:

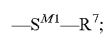

$S^{M1}$ represents an alkylene group having 1 to 12 carbon atoms or a single bond; a —CH$_2$— group included in the alkylene group may be replaced by an oxygen atom, —COO—, —OCO—, or —OCOO— as long as oxygen atoms are not directly bonded to each other; $R^7$ represents any one of the structures represented by Formulae (R-1) to (R-15):

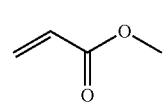

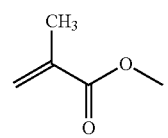

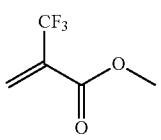 (R-3)

 (R-4)

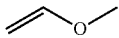 (R-5)

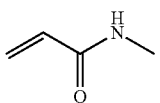 (R-6)

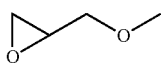 (R-7)

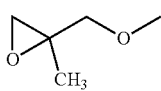 (R-8)

 (R-9)

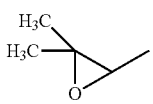 (R-10)

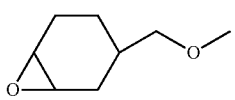 (R-11)

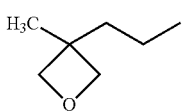 (R-12)

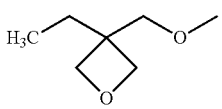 (R-13)

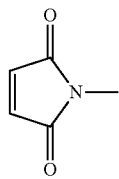 (R-14)

HS—— ;   (R-15)

$L^{M1}$ and $L^{M2}$ each independently represent a single bond, —O—, —CH$_2$—, —OCH$_2$—, —CH$_2$O—, —CO—, —C$_2$H$_4$—, —COO—, —OCO—, —CH=CH—COO—, —COO—CH=CH—, —OCO—CH=CH—, —CH=CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH—CH—, —CF=CH—, —CH=CF—, —CF=CF—, —CF$_2$—, —CF$_2$O—, —OCF$_2$—, —CF$_2$CH$_2$—, —CH$_2$CF$_2$—, —CF$_2$CF$_2$—, or —C≡C—; $M^{M1}$ represents a 1,4-phenylene group, a 1,4-cyclohexylene group, or a naphthalene-2,6-diyl group; and a hydrogen atom included in these groups may be replaced by a fluorine atom, a chlorine atom, an alkyl group having 1 to 8 carbon atoms, an alkyl halide group, an alkoxy halide group, an alkoxy group, a nitro group, or the following structure:

—S$^{M1}$—R$^7$;

$m^{M1}$ is 0, 1, or 2; and, in the case where a plurality of $M^{M1}$'s and $L^{M2}$'s are present, they may be the same or different).

18. A liquid crystal display element comprising the liquid crystal composition according to claim 1.

19. A liquid crystal display element for active-matrix driving, the liquid crystal display element comprising the liquid crystal composition according to claim 1.

20. A liquid crystal display element for VA mode, PSA mode, PSVA mode, IPS mode or ECB mode, the liquid crystal display element comprising the liquid crystal composition according to claim 1.

* * * * *